(12) United States Patent
Zhang et al.

(10) Patent No.: US 12,235,880 B2
(45) Date of Patent: Feb. 25, 2025

(54) METHOD AND APPARATUS FOR QUERYING QUESTIONS, DEVICE, AND STORAGE MEDIUM

(71) Applicant: BOE TECHNOLOGY GROUP CO., LTD., Beijing (CN)

(72) Inventors: Fan Zhang, Beijing (CN); Xiaohong Wei, Beijing (CN); Wangqiang He, Beijing (CN); Xinyu Miao, Beijing (CN); Chengwei Jiang, Beijing (CN); Yu Wang, Beijing (CN); Yufeng Wang, Beijing (CN); Hong Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 372 days.

(21) Appl. No.: 17/788,401

(22) PCT Filed: Jan. 12, 2021

(86) PCT No.: PCT/CN2021/071242
§ 371 (c)(1),
(2) Date: Jun. 23, 2022

(87) PCT Pub. No.: WO2021/169640
PCT Pub. Date: Sep. 2, 2021

(65) Prior Publication Data
US 2023/0044106 A1 Feb. 9, 2023

(30) Foreign Application Priority Data
Feb. 25, 2020 (WO) ................ PCT/CN2020/076600

(51) Int. Cl.
*G06F 17/27* (2006.01)
*G06F 16/332* (2019.01)
(Continued)

(52) U.S. Cl.
CPC ........ *G06F 16/332* (2019.01); *G06F 16/3347* (2019.01); *G06F 40/30* (2020.01)

(58) Field of Classification Search
CPC ...... G06F 16/3347; G06F 16/33; G06F 40/30; G06F 16/36; G06F 16/332; G06F 16/24578; G06Q 10/04; G09B 5/06
(Continued)

(56) References Cited

U.S. PATENT DOCUMENTS

2017/0186338 A1\* 6/2017 Treves .................... G09B 5/06
2019/0311064 A1 10/2019 Chakraborty et al.

FOREIGN PATENT DOCUMENTS

| CN | 106503189 A | 3/2017 |
|----|-------------|--------|
| CN | 107292115 A | 10/2017 |

(Continued)

OTHER PUBLICATIONS

International search report of PCT application No. PCT/CN2021/071242 issued on Apr. 12, 2021.
(Continued)

*Primary Examiner* — Md S Elahee
(74) *Attorney, Agent, or Firm* — Lippes Mathias LLP

(57) ABSTRACT

Provided is a method for querying questions. The method includes: acquiring input information of a user; acquiring intention information of the user based on the input information of the user; determining an answer generation rule; and generating, based on the input information and the intention information, a first answer in accordance with the answer generation rule, and providing the first answer to the user.

17 Claims, 14 Drawing Sheets

(51) Int. Cl.
*G06F 16/334* (2025.01)
*G06F 40/30* (2020.01)

(58) Field of Classification Search
USPC .............................................. 704/9
See application file for complete search history.

(56) References Cited

FOREIGN PATENT DOCUMENTS

| | | | | |
|---|---|---|---|---|
| CN | 107368547 A | 11/2017 | | |
| CN | 107908803 A | 4/2018 | | |
| CN | 108108449 A | 6/2018 | | |
| CN | 108446286 A | 8/2018 | | |
| CN | 108804521 A | 11/2018 | | |
| CN | 109102847 A | 12/2018 | | |
| CN | 105786871 B | 3/2019 | | |
| CN | 110019728 A | 7/2019 | | |
| CN | 110019729 A | 7/2019 | | |
| CN | 110019730 A | 7/2019 | | |
| CN | 110019838 A | 7/2019 | | |
| CN | 110019844 A | 7/2019 | | |
| CN | 110516057 A | 11/2019 | | |
| CN | 111798019 A | * 10/2020 | ............. | G06Q 10/04 |
| JP | 2019020774 A | 2/2019 | | |
| WO | 2019195042 A1 | 10/2019 | | |

OTHER PUBLICATIONS

International search report of PCT application No. PCT/CN2020/076600 issued on Dec. 9, 2020.
Extended European search report of counterpart European application No. 21761664.8 issued on Nov. 11, 2022.

\* cited by examiner

METHOD AND APPARATUS FOR QUERYING QUESTIONS, DEVICE, AND STORAGE MEDIUM

CROSS-REFERENCE TO RELATED APPLICATION

The present disclosure is a 371 of PCT Application No. PCT/CN2021/071242, filed on Jan. 12, 2021, which claims priority to PCT Application No. PCT/CN2020/076600, filed on Feb. 25, 2020, the contents of which are incorporated herein by references in their entireties.

TECHNICAL FIELD

The present disclosure relates to the field of computer technologies, and in particular, relates to an apparatus and method for querying questions, and a device and a storage medium thereof.

BACKGROUND

With the development of communication technologies, a user usually needs to query relevant information over a network. For example, the user usually queries disease information over the network to acquire his or her disease-related information where he or she have some physical discomfort.

SUMMARY

Embodiments of the present disclosure provide an apparatus and method for querying questions, and a terminal device and a computer-readable storage medium thereof.

One aspect of the embodiments of the present disclosure provides a method for querying questions. The method includes: acquiring input information of a user; acquiring intention information of the user based on the input information of the user; determining an answer generation rule; and generating, based on the input information and the intention information, a first answer in accordance with the answer generation rule, and providing the first answer to the user.

In one possible implementation, in the case that the answer generation rule is a first rule, generating, based on the input information and the intention information, the first answer in accordance with the answer generation rule includes:
generating, based on the input information and the intention information, a second answer in accordance with a question and answer model, and acquiring a credibility of the second answer; and
generating the first answer based on the credibility of the second answer and the second answer.

In another possible implementation, generating the first answer based on the credibility of the second answer and the second answer includes:
taking the second answer as the first answer in the case that the credibility of the second answer is greater than a first threshold;
further determining whether a third answer is generatable based on the input information in accordance with a knowledge graph model in the case that the credibility of the second answer is less than or equal to the first threshold;
taking the third answer as the first answer in the case that the credibility of the second answer is less than or equal to the first threshold and the third answer is generated in accordance with the knowledge graph model, and
taking the second answer as the first answer in the case that the credibility of the second answer is less than or equal to the first threshold and the third answer is not generatable in accordance with the knowledge graph model.

In another possible implementation, generating, based on the input information and the intention information, the second answer in accordance with the question and answer model, and acquiring the credibility of the second answer include:
acquiring a feature vector representation of the input information;
acquiring a set of candidate questions corresponding to the intention information from a preset library of questions and answers;
acquiring a feature vector representation of each candidate question in the set of candidate questions;
calculating a first similarity between the feature vector representation of the input information and the feature vector representation of each candidate question;
selecting a first candidate question from the set of candidate questions based on the first similarity between the feature vector representation of the input information and the feature vector representation of each candidate question; and
taking a candidate answer corresponding to the first candidate question in the library of questions and answers as the second answer, wherein the first similarity between the feature vector representation of the input information and the feature vector representation of the selected first candidate question is the credibility of the second answer.

In another possible implementation, in the case that the answer generation rule is a second rule, generating, based on the input information and the intention information, the first answer in accordance with the answer generation rule includes:
determining whether the intention information includes food;
determining whether a second answer is generatable based on the input information in accordance with a question and answer model in the case that the intention information does not includes food;
taking the second answer as the first answer in the case that the second answer is generatable in accordance with the question and answer model;
determining whether a third answer is generatable based on the input information in accordance with a knowledge graph model in the case that the intention information includes food; and
taking the third answer as the first answer in the case that the third answer is generatable in accordance with the knowledge graph model.

In another possible implementation, generating, based on the input information and the intention information, the first answer in accordance with the answer generation rule further includes:
generating, based on the input information, the third answer in accordance with the knowledge graph model in the case that the second answer is not generatable in accordance with the question and answer model, and taking the third answer as the first answer; and
generating, based on the input information, the second answer in accordance with the question and answer model in the case that the third answer is not generatable in accordance with the knowledge graph model.

In another possible implementation, prior to determining whether the intention information includes food, the method further includes:

determining whether the second answer is generatable based on the input information in accordance with the question and answer model or the third answer is generatable based on the input information in accordance with the knowledge graph model; and acquiring a set of candidate questions corresponding to the intention information from a preset library of questions and answers in the case that the second answer is not generatable in accordance with the question and answer model, and the third answer is not generatable in accordance with the knowledge graph model, and providing candidate questions in the set of candidate questions to the user.

In another possible implementation, generating, based on the input information and the intention information, the second answer in accordance with the question and answer model includes:

acquiring a feature vector representation of the input information;

acquiring a set of candidate questions corresponding to the intention information from a preset library of questions and answers;

acquiring a feature vector representation of each candidate question in the set of candidate questions;

calculating a first similarity between the feature vector representation of the input information and the feature vector representation of each candidate question;

determining one or more candidate questions from the set of candidate questions based on the first similarity between the feature vector representation of the input information and the feature vector representation of each candidate question;

taking a candidate answer corresponding to a candidate question in the library of questions and answers as the second answer in the case that the candidate question is determined;

providing a plurality of candidate questions to the user in the case that the plurality of candidate questions are determined;

acquiring a first select instruction of the user;

determining a candidate question selected by the user based on the first select instruction; and taking a candidate answer corresponding to the candidate question selected by the user from the library of questions and answers as the second answer.

In another possible implementation, acquiring the intention information of the user based on the input information of the user includes:

acquiring the feature vector representation of the input information; and acquiring intention information of the user by inputting the feature vector representation of the input information into an intention prediction model.

In another possible implementation, generating the third answer in accordance with the knowledge graph model includes:

identifying an entity type and a relationship type in the input information; and generating the third answer based on the entity type and relationship type by querying the knowledge graph model.

In another possible implementation, prior to acquiring the input information of the user, the method further includes:

acquiring attribute information of the user:

determining a feature vector representation of the attribute information:

determining a second similarity between the feature vector representation of the attribute information and the feature vector representation of each standard question in the preset library of questions and answers; and providing a recommendation question to the user question based on the second similarity.

In another possible implementation, upon providing the recommendation question to the user, the method further includes:

acquiring a second select instruction of the user;

determining a recommendation question selected by the user based on the second select instruction:

acquiring a fourth answer from the preset library of questions and answers based on the recommendation question selected by the user; and providing the fourth answer to the user.

In another possible implementation, upon acquiring the input information of the user, the method further includes:

generating a plurality of words by segmenting the input information;

determining whether the plurality of words are matched with any word in a preset library of synonyms; and selecting a prompt question from the preset library of questions and answers based on the match result, and providing the prompt question to the user.

In another possible implementation, upon selecting the prompt question from the preset library of questions and answers based on the match result, the method further includes:

acquiring a third select instruction of the user:

determining the prompt question selected by the user based on the third select instruction:

acquiring a fifth answer from the preset library of questions and answers based on the prompt question selected by the user; and providing the fifth answer to the user.

In another possible implementation, upon acquiring the input information of the user, the method further includes:

determining whether a number of characters in the input information is greater than a second threshold;

generating a plurality of single sentences by segmenting the input information in the case that the number of characters in the input information is greater than the second threshold;

determining a third similarity between each two single sentences in the plurality of single sentences in accordance with a preset algorithm; and determining a key sentence based on the third similarity between each two single sentences, and determining the key sentence as final input information.

In another possible implementation, upon determining whether the number of characters in the input information is greater than the second threshold, the method further includes:

determining whether the input information satisfies a preset supplementation condition in the case that the number of characters in the input information is not greater than the second threshold;

acquiring history input information of the user in the case that the number of characters in the input information is greater than the second threshold; and supplementing the input information based on the history input information, and taking the supplemented information as the final input information.

In another aspect of the embodiments of the present disclosure provides an apparatus for querying question. The apparatus includes: a first acquiring module, configured to acquire input information of a user; a second acquiring module, configured to acquire intention information of the user based on the input information of the user; a determining module, configured to determine an answer generation rule; a processing module, configured to generate, based on the input information and the intention information, a first answer in accordance with the answer generation rule; and an answer providing module, configured to provide the first answer to the user.

In yet another aspect of the embodiments of the present disclosure provides a terminal device. The terminal device includes a memory, a processor, and a computer program stored on the memory and executable on the processor, wherein the processor, when loading and running the computer program, is caused to perform the method for querying questions according to above aspects.

In yet another aspect of the embodiments of the present disclosure provides a computer-readable storage medium. The computer-readable stores a computer program, wherein the computer program, when loaded and run by a processor, causes the processor to perform the method for querying questions according to above aspects.

BRIEF DESCRIPTION OF THE DRAWINGS

The foregoing and/or additional aspects and advantages of the present disclosure may be apparent and readily understood according to the following description of the embodiments in conjunction with the accompanying drawings.

DETAILED DESCRIPTION

Embodiments of the present disclosure are described in detail hereinafter, and examples of all embodiments are illustrated in the accompanying drawings. Same or similar numerals refer to the same or similar elements or elements having the same or similar function.

The embodiments described hereinafter with reference to the accompanying drawings are exemplary, are intended to explain the present disclosure, and are not be construed as limiting the present disclosure.

For a technical problem in the related art that acquiring disease-related information on the network by browsing page by page is time-consuming for a user, and the user fails to accurately acquire the answer to a queried question due to a large amounts of solutions to various questions on the network, the embodiments of the present disclosure provide a method and apparatus for querying question, and a terminal device and a computer-readable storage medium thereof.

In the method and apparatus for querying question, and the terminal device and the computer-readable storage media thereof provided in the embodiments of the present disclosure, a first answer is generated based on input information and intention information of the user in accordance with an answer generation rule, and the first answer is provided to the user, such that automatically providing corresponding accurate answer to the user based on the input information of the user is achieved, the time and effort of the user are saved, and the user experience is improved.

The method and apparatus for querying question, and the terminal device and the computer-readable storage media thereof in the embodiments of the present disclosure are described hereinafter with reference to the accompanying drawings.

It should be noted that the order of execution of the various processes in the present disclosure is not limited, and an order of execution of the processes may be changed if executable. Although the embodiments of the present disclosure provide the processes of the method as illustrated in the following embodiments or accompanying drawings, more or fewer processes may be included in the method based on conventional effort or effort without inventive.

In the processes of logically absent the necessary causality, the order of execution of the processes is not limited to the order of execution provided in the embodiments of the present disclosure.

Figure 1:
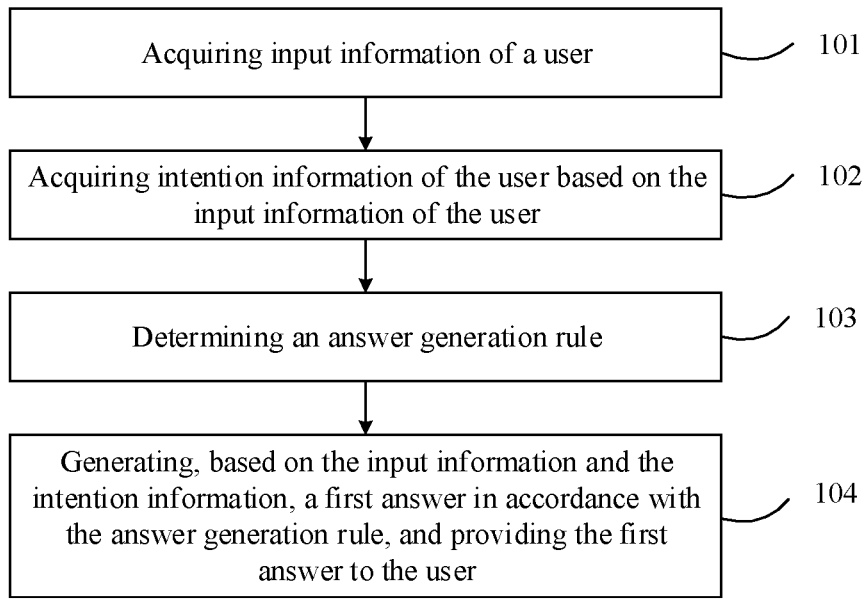
FIG. 1 is a flowchart of a method for querying questions according to an embodiment of the present disclosure.

First, the method for querying questions provided in the embodiments of the present disclosure is described in detail in conjunction with FIG. 1.

FIG. 1 is a flowchart of a method for querying questions according to an embodiment of the present disclosure.

As shown in FIG. 1, the method for querying questions in the present disclosure may include the following processes.

In S101, input information of a user is acquired.

In particular, the method for querying questions provided in the embodiments of the present disclosure may be performed by a terminal device provided in the embodiments of the present disclosure. The terminal device includes an apparatus for querying question (hereinafter referred to as a query apparatus) to automatically provide a corresponding accurate answer to the user based on the input information of the user in the case that the user is intended to query the relevant information of the question. In the embodiments, the terminal device may be any hardware device with a function of data processing, such as a smartphone, a tablet, a personal digital assistant, or the like, which is not limited in the present disclosure.

It should be understood that the question may include any type of commonsense question, such as a common sense of life, a common sense of literature, a common sense of economy, a common sense of technology, and the like, which is not limited in the present disclosure. In the present disclosure, taking the query of a disease-related question as an example, the disease in the present disclosure may be diabetes, hypertension, coronary heart disease, stroke, and the like, which is not limited in the present disclosure.

In particular, a user interaction interface may be disposed in the query apparatus, such that the user may input information based on the information to be queried of the user through the interaction interface.

The input information of the user may be in the text form, in the voice form, or any other form, which is not limited in the present disclosure.

For example, in the case that the user is intended to query which food should a diabetes patient to eat, the user may input "what should a diabetes patient to eat" in the text form or "what should a diabetes patient to eat" in the voice form into the user interaction interface to query the specific food suitable for the diabetes patient.

In some exemplary embodiments, in the case that the information is input by the user in the voice form, and the voice information input by the user is received, a voice recognition may be performed on the received voice information to acquire the input information corresponding to the voice information in the text form.

In S102, intention information of the user is acquired based on the input information of the user.

The intention information may represent an intention of the user, and may include an intention type corresponding to the input information of the user and a probability corresponding to the intention type.

In particular, a plurality of intention types may be pre-defined, such that after the input information of the user is acquired, the intention type corresponding to the input information of the user and the probability corresponding to the intention type may be determined to acquire the intention information of the user.

For example, the intention type may be classified in advance as the food, the motion, the therapy, the medication, the complication, the symptom, the prevention, and the like.

In the case that the user inputs "what should a diabetes patient to eat", that is, in the case that the intention of the user is to query the food for the diabetes patient, the intention type is determined as the food, and then the intention information may be determined as including "food" and "P1" where the corresponding probability is P1. In the case that the user inputs "how to prevent diabetes?" that is, in the case that the intention of the user is to query the prevention knowledge of the disease, the intention type is determined as the prevention, and then the intention information is determined as including "prevent" and "P2" where the corresponding probability is P2.

In the specific implementation, the intention information of the user may be acquired based on the input information of the user and a pre-trained intention prediction model by the following processes. That is, S102 may be performed by the following processes.

In S102a, a feature vector representation of the input information is acquired.

A plurality of words are generated by segmenting the input information, the feature vector representation of the plurality of words is acquired, and the feature vector representation of the plurality of words is combined to acquire the feature vector representation of the input information.

In some exemplary embodiments, the input information may be input into a tokenizer, and then the tokenizer segments the input information into the plurality of words.

For example, assuming that the input information is "what should a diabetes patient to eat?" the input information is segmented by the tokenizer to acquire a plurality of words. Assuming that $w_1$, $w_2$, . . . $w_n$ are used to represent the plurality of generated words, $w_1$ represents the word "a diabetes patient," $w_2$ represents the word "should," $w_3$ represents the word "to eat", and $w_4$ represents the word "what."

In addition, training corpus data including accurate answers corresponding to a large number of questions may be pre-acquired, and the training corpus data is pre-processed, for example, removing some unimportant words or punctuation marks, and the like. Then, each sentence in the pre-processed training corpus data is segmented to generate a plurality of words corresponding to each sentence, and a corresponding feature vector representation corresponding to each word in the plurality of words of each sentence is generated, so as to construct a word vector library corresponding to the training corpus data. Upon generating the plurality of words corresponding to the input information, the feature vector representation corresponding to the plurality of words may be acquired by querying the word vector library corresponding to the training corpus data. The feature vector representation of the input information may be acquired by combining the feature vector representation corresponding to the plurality of words.

The feature vector representation corresponding to a single word may be generated in a plurality of means. For example, the feature vector representation corresponding to each word may be acquired by querying in an open source word vector library.

Alternatively, a one-hot feature vector corresponding to the input information of the user may be acquired, or the feature vector representation of the input information of the user may be acquired in other means, and the mean of acquiring the feature vector representation of the input information is not limited in the present disclosure.

In S102b, the intention information of the user is acquired by inputting the feature vector of the input information into the intention prediction model.

The intention prediction model may be any model capable of text classification, such as a TextCNN model (a model that classifies text through a convolutional neural network), and the like, which is not limited in the present disclosure.

Specifically, the intention prediction model may be pre-trained. The input to the intention prediction model is the feature vector representation of the input information of the user, and the output to the intention prediction model includes a corresponding intention type and a probability value corresponding to the intention type. After the feature vector representation of the input information is acquired, the feature vector representation of the input information may be input into the intention prediction model to acquire the intention information of the user.

In some exemplary embodiments, taking the training of the TextCNN model as an example, the TextCNN model may be constructed using a keras deep learning framework, the training corpus data is divided into a training set, a validation set, and a test set in a scale of 10:1:1 to train the model, and the acquired optimized model is taken as the intention prediction model in the embodiments of the present disclosure.

The specific processes of training the intention prediction model may be referred to the processes of training the model in the related art, which is not repeated herein.

In S103, an answer generation rule is determined.

A plurality of answer generation rules may be preset, and the user may select a corresponding answer generation rule as required. For example, an answer generation rule option box may be set for user selection, or, the answer generation rule may also be recommended based on the query habits of the user (e.g., a frequency of the selected answer generation rule, the intention information corresponding to the input information, and the like).

In S104, a first answer is generated based on the input information and the intention information in accordance with the answer generation rule, and is provided to the user.

Figure 2:
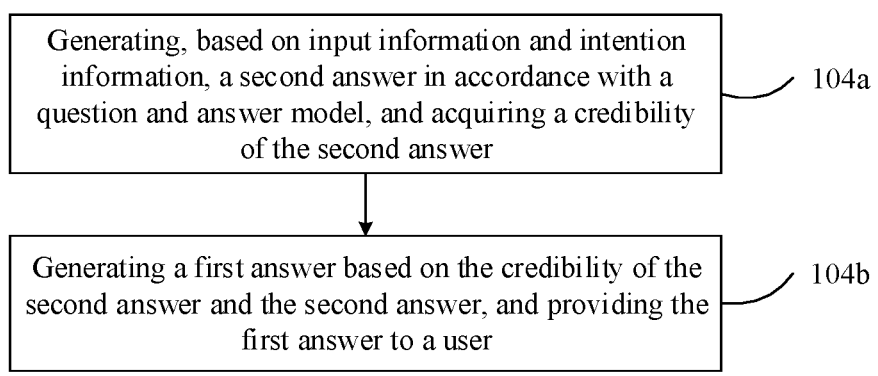
FIG. 2 is a flowchart of a method for querying questions according to an embodiment of the present disclosure.

Two answer generation rules may be preset, and the first answer may be acquired in the case that the answer generation rule is the first rule. That is, as shown in FIG. 2, S104 may include the following S104a to S104b.

In S104a, a second answer is generated based on the input information and the intention information in accordance with a question and answer model, and a credibility of the second answer is acquired.

The question and answer model may be pre-trained. The input to the question and answer model is the input information and the intention information of the user, and the output to the question and answer model is a first candidate question corresponding to the input information and the intention information of the user. After the input information and the intention information of the user are acquired, the input information and the intention information are input into the question and answer model to acquire the first candidate question corresponding to the input information and the intention information.

In addition, a library of questions and answers may be preset, and the library of questions and answers includes various standard questions and the corresponding accurate answers. After the first candidate question is acquired, a candidate answer corresponding to the first candidate question in the library of questions and answers may be taken as a second answer.

The various standard questions and the corresponding accurate answers in the library of questions and answers may include various disease-related high-frequency questions and corresponding accurate answers crawled from the network, various disease-related questions and corresponding accurate answers that are artificially added, and various disease-related questions and corresponding accurate answers acquired by other mean, which are not limited in the present disclosure. In addition, the data in the library of questions and answers may be pre-processed data de-duplicating and deleting unnecessary characters, which is not limited in the present disclosure.

It is noted that the various standard questions and corresponding accurate answers in the library of questions and answers may possess unique identification. Correspondingly, the output to the question and answer model may be the identification of the first candidate question corresponding to the input information and the intention information of the user input into the question and answer model, such that the answer corresponding to the standard question corresponding to the identification may be acquired from the library of questions and answers based on the identification of the first candidate question to act as the second answer.

The question and answer model may be any model capable of semantic matching, such as a BiLSTM and DSSM model (a bi-directional long short term memory network model and a deep structured semantic module), and the like, which is not limited in the present disclosure.

In some exemplary embodiments, taking the training of the BiLSTM and DSSM model as an example, the various standard questions in the library of questions and answers may be taken as the training corpus data. The BiLSTM and DSSM model can be constructed using a keras deep learning framework, the training corpus data is divided into a training set, a validation set, and a test set in a scale of 10:1:1 to train the model, and the acquired optimized model is taken as the question and answer model in the embodiments of the present disclosure.

The question and answer model may acquire the first candidate question in the following means. That is, S104a may include the following S104aa to S104af.

In S104aa, the feature vector representation of the input information is acquired.

The method for acquiring the feature vector representation of the input information may be referred to the related description in S102a, which is not repeated herein.

In S104ab, a set of candidate questions corresponding to the intention information is acquired from the preset library of questions and answers.

The intention types corresponding to the various standard questions in the library of questions and answers may be annotated in advance, such that after the intention information of the user is acquired, the various standard questions corresponding to the intention type of the user may be acquired from the preset library of questions and answers based on the intention information of the user, and the set of standard questions are taken as the set of candidate questions.

It is noted that, in the case that the intention information of the user is acquired based on the input information of the user, the probability value corresponding to the intention type output by the intention prediction model may be small, that is, the accuracy of the determined intention information is low. For example, the probability value corresponding to the intention type output by the intention prediction model is less than a preset probability threshold, and the probability threshold may be set as required, such as 0.5. In this case, the output set of candidate questions may be an empty set. That is, the question and answer model merely outputs a set of standard questions corresponding to the intention type with the probability value greater than the preset probability threshold.

In S104ac, the feature vector representation of each candidate question in the set of candidate questions is acquired.

After the question and answer model acquires the set of candidate questions, the feature vector representation of each candidate question in the set of candidate questions may be acquired. The feature vector representation of the candidate question may be a one-hot feature vector, and may further be other types feature vector, which is not limited in the present disclosure.

The method for acquiring the feature vector representation of the candidate question may be referred to the method for generating the feature vector in the related art, which is not repeated herein.

In S104ad, a first similarity between the feature vector representation of the input information and the feature vector representation of each candidate question is calculated.

In S104ae, a first candidate question is selected from the set of candidate questions based on the first similarity between the feature vector representation of the input information and the feature vector representation of each candidate question.

In S104af, a candidate answer corresponding to the first candidate question in the library of questions and answers is taken as the second answer, wherein the first similarity between the feature vector representation of the input information and the feature vector representation of the selected first candidate question is the credibility of the second answer.

After the question and answer model calculates the first similarity between the feature vector representation of the input information and the feature vector representation of each candidate question, a candidate question having the greatest first similarity with the feature vector representation of the input information may be taken as the first candidate question. The candidate answer corresponding to the first candidate question in the question answer library is taken as the second answer, and the first similarity between the feature vector of the input information and the feature vector representation of the selected first candidate question is taken as the credibility of the second answer.

It is noted that the question and answer model may determine a plurality of the first candidate question determined, and thus there may be a plurality of second answers. In the embodiments of the present disclosure, in the case that there are a plurality of determined first candidate questions, the plurality of first candidate questions may be provided to the user to determine, based on the selection of the first candidate question of the user, the final first candidate question and the corresponding second answer.

The second answer corresponding to the input information is determined from the preset library of questions and answers in accordance with the pre-trained question and answer model, which improves the accuracy of the determined second answer. In addition, the intention information of the user is first determined based on the input information of the user, and then the second answer is generated based on the intention information and the input information, such that the question and answer model may merely calculate the first similarity between the feature vector representation of the input information and the feature vector representation of each candidate question corresponding to the determined intention type. Thus, the amount of processing data of the question and answer model is reduced, the time of generating the second answer is saved, and the efficiency and the user experience are improved.

In S104b, the first answer is generated based on the credibility of the second answer and the second answer, and is provided to the user.

Figure 3:
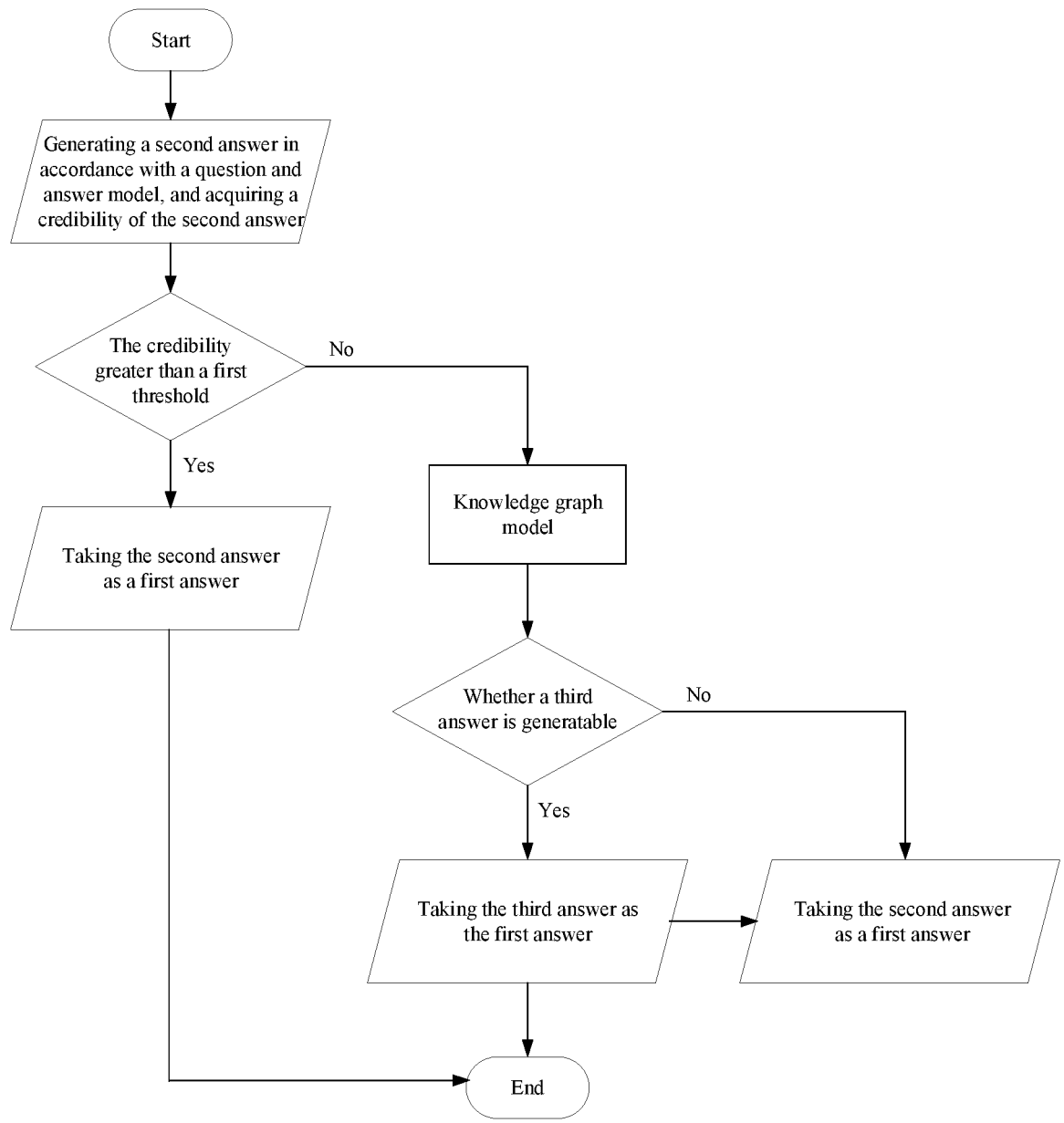
FIG. 3 is a flowchart of a method for querying questions according to an embodiment of the present disclosure.

In some exemplary embodiments, the first threshold may be set. As shown in FIG. 3, after the second answer and the credibility of the second answer are acquired, whether the credibility of the second answer is greater than the first threshold is determined, and the second answer is taken as the first answer in the case that the credibility of the second answer is greater than the first threshold.

The first threshold may be set as required, for example, 0.9, 0.8, and the like.

In the embodiments of the present disclosure, it is noted that storage formats of the standard questions and the corresponding accurate answers in the library of questions and answers may be in a dictionary format. For example, in the case that the identification is "30," the question is "are dry mouth and a frequency of urination symptoms of diabetes?" and the answer is "dry mouth has many causes, and may be caused by poor diet, psychological and lifestyle habits, or may be caused by diseases such as diabetes characterized by excessive drinking, eating, urination and wasting. Patient should make further examination to confirm whether it is diabetes," the corresponding storage format may be {("qid:" "30," "question" "Are dry mouth and a frequency of urination symptoms of diabetes?" "answer:" "dry mouth has many causes, and may be caused by poor diet, psychological and lifestyle habits, or may be caused by diseases such as diabetes characterized by excessive drinking, eating, urination and wasting. Patient should make further examination to confirm whether it is diabetes" }. In the case of determining the second answer, the query apparatus may take the candidate answer corresponding to the determined first candidate question (that is, the "answer" field corresponding to the first candidate question) as the second answer, and take the second answer as the first answer, and provide the second answer to the user in the case that the credibility of the second answer is greater than the first threshold.

In the case that the standard questions and corresponding answers are stored in the dictionary format, the query apparatus is more convenient to query the required question or answer in the library of questions and answers.

In some exemplary embodiments, as shown in FIG. 3, whether a third answer is generatable based on the input information in accordance with the knowledge graph model is further determined in the case that the credibility of the second answer is less than or equal to the first threshold. The third answer is taken as the first answer in the case that the credibility of the second answer is less than or equal to the first threshold and the third answer is generatable in accordance with the knowledge graph model, and the second answer is taken as the first answer in the case that the credibility of the second answer is less than or equal to the first threshold and the third answer is not generatable in accordance with the knowledge graph model.

For example, assuming that the probability threshold value is 0.5, the first threshold value is 0.9, and the input information of the user is "how to prevent diabetes" in the text form, the query apparatus may determine, based on the input information of the user, that the intention information of the user includes "prevent" and "0.8" in accordance with the intention prediction model. Then, the first candidate question may be determined based on the input information and the intention information of the user in accordance with the question and answer model, and the second answer corresponding to the first candidate question may be acquired from the preset library of questions and answers. In the case that the credibility of the second answer is 0.95, the second answer may be determined as the first answer and provided to the user in the form shown in FIG. 4.

Figure 4:
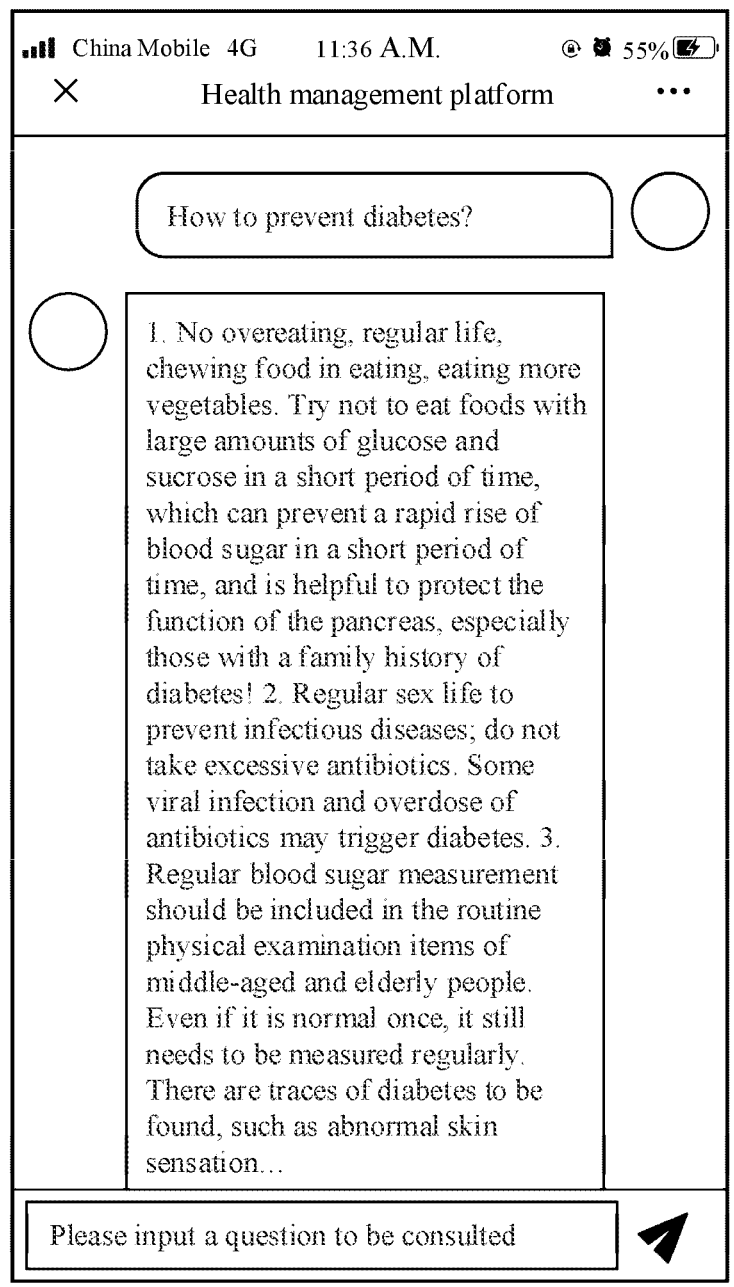
FIG. 4 is a schematic diagram of a user interaction interface according to an embodiment of the present disclosure.

As shown in FIG. 4, the query apparatus may be an application software, which is disposed in a smartphone, and the application software provides a user interaction interface. In the case that the user is intended to query the prevention knowledge of the diabetes, the information may be input into the user interaction interface. Assuming that the information input into the user interaction interface by the user is "how to prevent diabetes" in the text form, the second answer is determined to be "1. No overeating, regular life, chewing food in eating, eating more vegetables . . . " and the application software determines that the credibility of the second answer is greater than the first threshold, the second answer may be determined as the first answer, and the first answer is provided to the user to make the user realize the information related to the prevention of diabetes.

Figure 5:
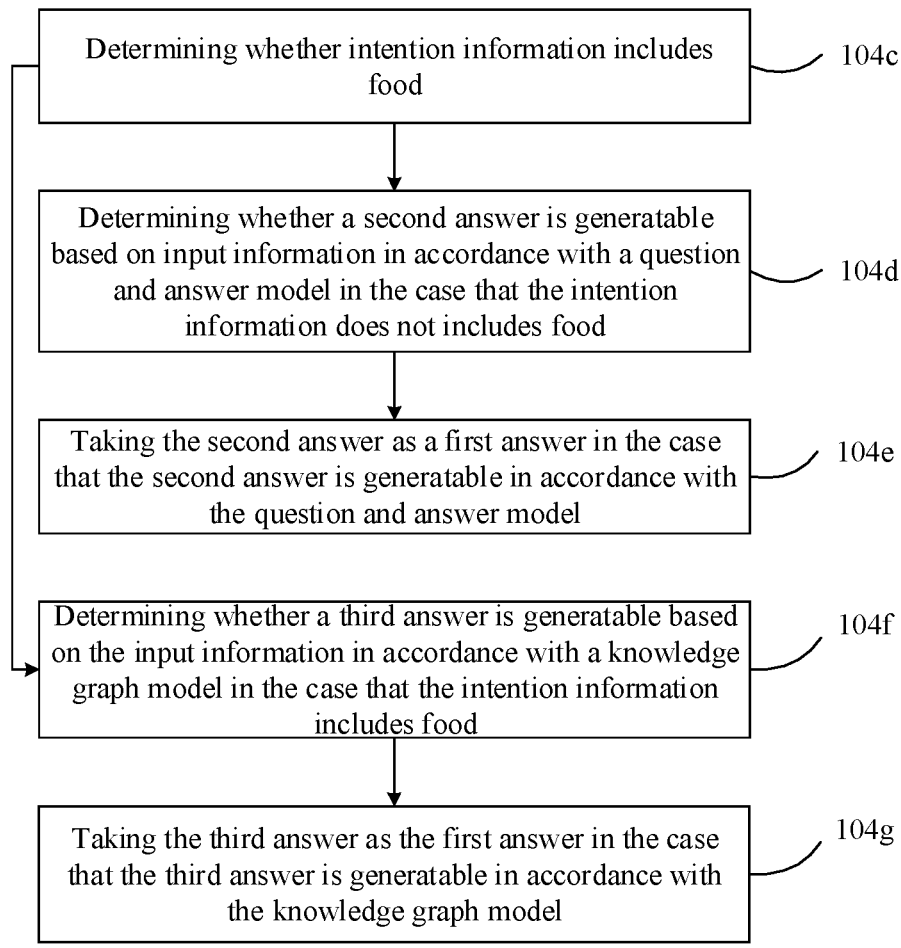
FIG. 5 is a flowchart of another method for querying questions according to an embodiment of the present disclosure.

In the case that the answer generation rule is a second rule, the first answer may be acquired in the following means. That is, as shown in FIG. 5, process S104 may include the following processes S104c to S104g.

In S104c, whether the intention information includes food is determined.

For example, assuming that the input information is "what should a diabetes patient to eat," "could a diabetes patient eat an apple," and the like, the intention information may be determined to include the food. Assuming that the input information is "how to prevent diabetes," "exercise notes of a diabetes patient." and the like, the intention information may be determined to not include the food.

In S104d, whether the second answer is generatable in accordance with the question and answer model is determined in the case that the intention information does not include the food.

In S104e, the second answer is taken as the first answer in the case that the second answer is generatable in accordance with the question and answer model.

Specifically, generating, based on the input information and the intention information, the second answer in accordance with the question and answer model may include: acquiring the feature vector representation of the input information; acquiring the set of candidate questions corresponding to the intention information from the preset library of questions and answers; acquiring the feature vector representation of each candidate question in the set of candidate questions; calculating the first similarity between the feature vector representation of the input information and the feature vector representation of each candidate question; determining one or more candidate questions from the set of candidate questions based on the first similarity between the feature vector representation of the input information and the feature vector representation of each candidate question; and taking the candidate answer corresponding to the candidate question in the library of questions and answers as the second answer in the case that one candidate question is determined. And generating the second answer in accordance with the question and answer model may be referred to the related description in S104a, which is not repeated herein.

In some exemplary embodiments, a plurality of candidate questions are provided to the user in the case that the plurality of candidate questions are determined; a first select instruction of the user is acquired; a candidate question selected by the user is determined based on the first select instruction; and a candidate answer corresponding to the candidate question selected by the user from the library of questions and answers is taken as the second answer.

In some exemplary embodiments, in the case that the second answer is not generatable in accordance with the question and answer model, the third answer is generated based on the input information and the third answer in accordance with the knowledge graph model, and the third answer is taken as the first answer.

In S104f, whether the third answer is generatable based on the input information in accordance with the knowledge graph model is determined in the case that the intention information includes food.

In S104g, the third answer is taken as the first answer in the case that the third answer is generatable in accordance with the knowledge graph model.

It is noted that the intention information including the food is exemplary. In the case that the intention information includes food, the third answer acquired in accordance with the knowledge graph model is more accurate than the first answer acquired in accordance with the question and answer model.

In some exemplary embodiments, in the case that the third answer is not generatable in accordance with the knowledge graph model, the second answer is generated based on the input information in accordance with the question and answer model, and the second answer is taken as the first answer.

It is noted that, prior to determining whether the intention information includes the food, the method may further include: determining whether the second answer is generatable in accordance with the question and answer model or the third answer is generatable based on the input information in accordance with the knowledge graph model; and acquiring the set of candidate questions corresponding to the intention information from a preset library of questions and answers in the case that the second answer is not generatable in accordance with the question and answer model, and the third answer is not generatable in accordance with the knowledge graph model, and providing candidate questions in the set of candidate questions to the user to select, and taking the candidate answer corresponding to the candidate question selected by the user from the library of questions and answers as the first answer. In the case that the second answer is generatable in accordance with the question and answer model, or the third answer is generatable in accordance with the knowledge graph model, processes S104c to S104g described above are performed.

Thus, the final first answer is determined based on the input information in accordance with the question and answer model and the knowledge graph model, which improving the accuracy of the answer determined by the query apparatus. In addition, the question query requirements of different users may be better met by setting different answer generation rules.

It should be understood that, in the case that the intention information of the user is acquired based on the input information of the user, and the probability value corresponding to the intention type output by the intention prediction model is small, for example, less than the preset probability threshold (the probability threshold may be arbitrarily set as required, such as 0.5), as the output set of candidate questions is an empty set, the calculation of the first similarity in accordance with the question and answer model is not necessary to be performed, and whether the third answer is generated based on the input information in accordance with the knowledge graph model is determined. Thus, the amount of processing data of the question and answer model is reduced, the time of generating the first answer is saved, and the efficiency and the user experience are improved.

In the method for querying questions in the embodiments of the present disclosure, the second answer is generated based on the input information and the intention information of the user in accordance with the answer generation rule, and the final answer is generated based on the second answer and the credibility of the second answer and provided to the user, such that corresponding accurate answer is automatically provided to the user based on the input information of the user, the time and effort of the user are saved, and the user experience is improved.

In conjunction with FIG. 6, the process of generating the third answer based on the input information in accordance with the knowledge graph model is described hereinafter in the embodiments of the present disclosure.

Figure 6:
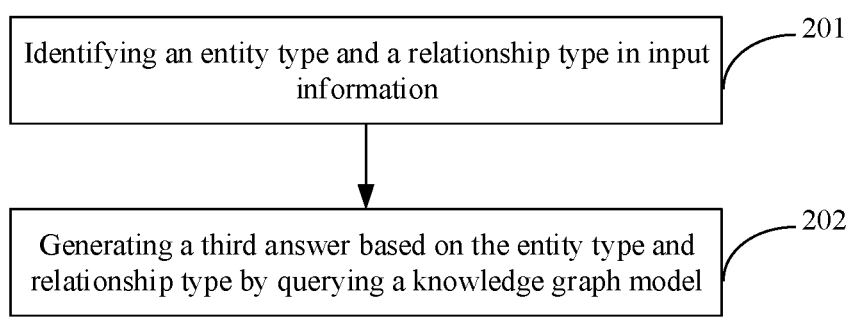
FIG. 6 is a flowchart of a method for generating a third answer based on input information in accordance with a knowledge graph model according to an embodiment of the present disclosure.

FIG. 6 is a flowchart of a method for generating a third answer based on input information in accordance with a knowledge graph model according to an embodiment of the present disclosure.

As shown in FIG. 6, in the embodiments of the present disclosure, the process of generating the third answer based on the input information in accordance with the knowledge graph model may include:

In S201, an entity type and a relationship type in the input information are identified.

In particular, a plurality of entity types may be predefined, and the entity type in the input information is identified in accordance with a pre-trained entity identification model.

The entity identification model may be a model with any entity identification function, such as a BiLSTM and CRF deep learning model, which is not limited in the present disclosure.

In some exemplary embodiments, taking the training of the BiLSTM and CRF model as an example, questions and corresponding answer data in the training corpus data may be analyzed. The defined entity types are annotated, and the training corpus data of the annotated entity type are taken as training data. The BiLSTM and CRF model may be constructed using a keras deep learning framework, the training corpus data is divided into a training set, a validation set, and a test set in a scale of 10:1:1 to train the model, and the acquired optimized model is taken as the question and answer model in the embodiments of the present disclosure.

In the case that the annotation for entity type is performed on the training corpus data, a method of begin-inside-outside (BIO) may be adopted.

In the BIO method, each element is annotated with "B-X," "I-X," or "O." The "B-X" represents that the segment of the element belongs to the X type and the element is located at the beginning of the segment, "I-X" represents that the segment of the element belongs to the X type and the element is located at the inside of the segment, and the "O" represents that the element does not belong to any type. Specific annotation processes may be referred to the related art, which is not repeated herein.

In the specific implementation, the input to the entity identification model is the feature vector representation of the input information, and the output to the entity identification model is the entity type in the input information. Thus, after the input information of the user is acquired, the feature vector representation of the input information of the user may be acquired, and then the feature vector representation is input into the entity identification model to determine the entity type in the input information.

The feature vector representation of the input information may be a one-hot feature vector, or other types of feature vector, which is not limited in the present disclosure.

In some exemplary embodiments, after the entity identification model identifies the entity type in the input information, the identified results may be combined by the BIO method to send to the query apparatus in a tabular form.

For example, assuming that the predefined entity type includes disease and food, the input information of the user is "could a diabetes patient eat an apple?" the entity type recognized by the entity identification model may include "a diabetes patient" and "an apple," and the identification result sent by the entity identification model to the query apparatus may be [['a diabetes patient,' 'an apple'], ['disease,' 'food']].

A plurality of relationship types may be predefined, and a template is defined based on the defined relationship types, such that the defined template is used to identify the relationship type in the input information.

For example, relationship types (such as "suitable for eating," "avoiding eating," "intake," "symptoms," "content of nutritional elements," and the like) may be predefined, and the template corresponding to the relationship type of "suitable for eating" may be defined as "can xxx (a disease entity) eat xxx (a food entity)?" and the template corresponding to the relationship type "symptoms" is "would xxx (disease entity) be xxx (symptom entity)?" Therefore, in the case that the input information of the user is "could a diabetes patient eat an apple", the input information may be determined as including the relationship type "suitable for eating" based on the predefined template.

In S202, the third answer is generate based on the entity type and the relationship type by querying the knowledge graph model.

The knowledge graph model may be pre-built, such that the third answer may be generated by calling the knowledge graph model after the entity type and the relationship type in the input information are identified.

The knowledge graph model includes various relationships between entities and entities. As the question and answer method in the present disclosure is related to the disease, in the knowledge graph model of the present disclosure, the entities may include entities in the disease field, the food field, the nutritional field, and the relationships may include relationships between the disease and the food.

Still taking the above embodiment as an example, the process of generating the third answer based on the entity type and relationship type by querying the knowledge graph model is described in the present disclosure.

In the case that the entity type in the input information of the user is "a diabetes patient" and "an apple," and the relationship type is "suitable for eating," whether a relationship "suitable for eating" is present between "an apple" and "a diabetes patient" is queried in accordance with the knowledge graph model. In the case that the relationship "suitable for eating" is present between "an apple" and "a diabetes patient." the third answer may include "eating appropriately." The relationship "a reason" of "an apple" is then called to determine the reason of suitable for eating, and the reason of "eating appropriately" and suitable for eating is combined to determine that the third answer is "an apple may be ate appropriately because the apple may reduce blood glucose content and prevent diabetes."

In some exemplary embodiments, the generated third answer may be stored in a preset format. For example, the data format of the third answer may be: ("question": "could a diabetes patient eat an apple?" "answer": "an apple may be ate appropriately because the apple may reduce blood glucose content and prevent diabetes").

In this way, the third answer may be generated based on the input information of the user in accordance with the knowledge graph model, such that the third answer is provided to the user as the first answer in the case that the credibility of the second answer is less than or equal to the first threshold.

Figure 7:
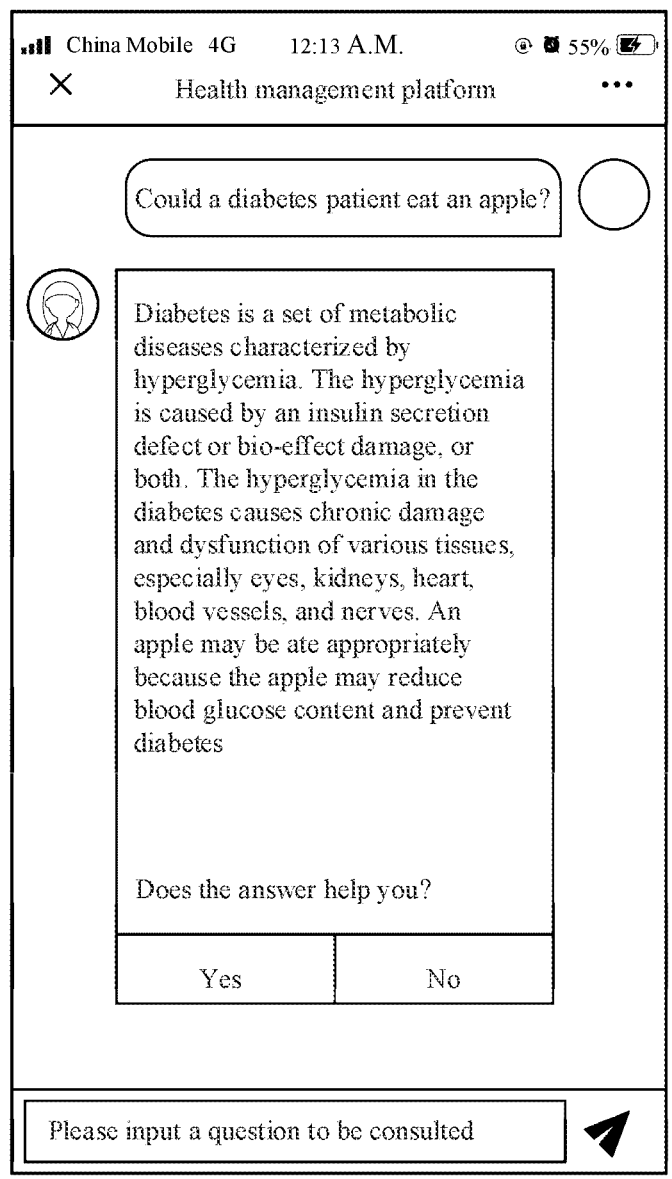
FIG. 7 is a schematic diagram of another user interaction interface according to an embodiment of the present disclosure.

As shown in FIG. 7, the query apparatus may be an application software, which is disposed in a smartphone, and the application software provides a user interaction interface. In the case that the user is intended to query the related diet information of the diabetes, the corresponding information may be input into the user interaction interface. Assuming that the information input into the user interaction interface by the user is "could a diabetes patient eat an apple" in the text form, the credibility of the second answer generated by the application software in accordance with the question and answer model is less than or equal to the first threshold, the third answer generated in accordance with the knowledge graph model is: "diabetes is a set of metabolic diseases characterized by hyperglycemia. The hyperglycemia is caused by an insulin secretion defect or bio-effect damage, or both. The hyperglycemia in the diabetes causes chronic damage and dysfunction of various tissues, especially eyes, kidneys, heart, blood vessels, and nerves. An apple may be ate appropriately because the apple may reduce blood glucose content and prevent diabetes," and the third answer may be provided to the user as the first answer as shown in FIG. 7.

It is noted that the entity identification model may not identify the entity type in the input information of the user, or may not identify the relationship type in the input information of the user through a predefined template, or the entity type and the answer corresponding to the relationship type are not queried from the knowledge graph model. Thus, the third answer may not be generatable in the method described above. In this case, the second answer generated in accordance with the question and answer model may be provided to the user as the first answer.

In addition, the process of the generation of the second answer in accordance with the question and answer model and the process of the generation of the third answer in accordance with the knowledge graph model may be performed simultaneously. Thus, in the case that the credibility of the second answer generated in accordance with the question and answer model is less than or equal to the first threshold, whether the third answer is generatable in accordance with the knowledge graph model may be directly determined, and the second answer or the third answer is selected as the first answer based on the determination result of whether the third answer is generatable in accordance with the knowledge graph model, thereby saving the time of the generation of the first answer.

It is noted that the process of the generation of the second answer in accordance with the question and answer model and the process of the generation of the third answer in accordance with the knowledge graph model may not be performed simultaneously, which is not limited in the present disclosure.

It can be seen from the foregoing analysis that, the method for querying questions provided in the present disclosure may provide the corresponding answer to the user based on the input information of the user. In some exemplary embodiments, the query apparatus may also recommend a question of interest to the user, so as to further save the user time. The method for querying questions provided in the embodiments of the present disclosure is further described hereinafter in conjunction with FIG. 8.

Figure 8:
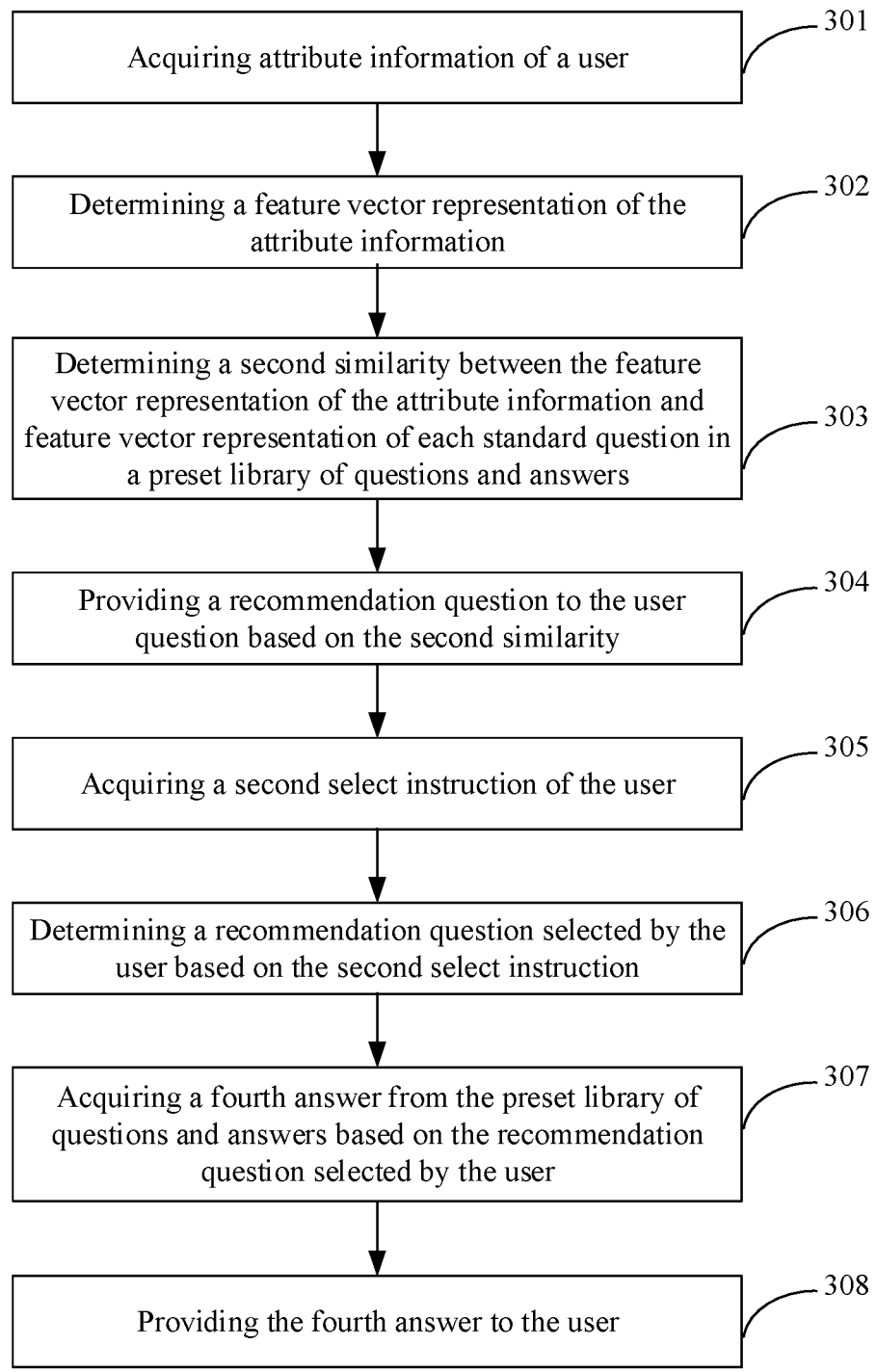
FIG. 8 is a flowchart of another method for querying questions according to an embodiment of the present disclosure.

FIG. 8 is a flowchart of a method for querying questions according to another embodiment of the present disclosure.

As shown in FIG. 8, the method for querying questions of the present disclosure may further include the following processes.

In S301, attribute information of a user is acquired.

The attribute information may include an age, gender, disease type, gestation, family history, and the like.

In S302, a feature vector representation of the attribute information is determined.

The method for acquiring the feature vector representation of the attribute information is similar to the method for acquiring the feature vector of the input information of the user, which is not repeated herein.

In S303, a second similarity between the feature vector representation of the attribute information and the feature vector representation of each standard question in a preset library of questions and answers is determined.

In S304, a recommendation question is provided to the user based on the second similarity.

In the embodiments of the present disclosure, the question of interest of the user is provided to the user based on the attribute information of the user by a collaborative filtering based algorithm.

Each standard question and corresponding accurate answer in the preset library of questions and answers may be annotated based on the attribute information. For example, a standard question related to gestation is annotated as 1, and a standard question related to not gestation is annotated as 2. The feature vector representation of each standard question is determined, and a second similarity between the feature vector representation of the attribute information and the feature vector representation of each annotated standard question in the preset library of questions and answers is determined.

In the specific implementation, a Pearson correlation coefficient method or other methods may be used to determine the second similarity between the feature vector representation of the attribute information and the feature vector representation of each standard questions in the preset library of questions and answers.

In addition, a third threshold may be preset, and a standard question that a second similarity between a feature vector representation of the standard question and the feature vector representation of the attribute information is greater than the third threshold is provided to the user as the recommendation question.

It is noted that a number of recommendation questions may be set as required. For example, in the embodiments of the present disclosure, the number of recommendation questions may be preset to be five, such that the standard questions may be arranged based on the second similarity from a high to low order, and a top five standard questions of the second similarity between the feature vector representation of the standard questions and the feature vector representation of the attribute information greater than the third threshold are provided to the user as the recommendation questions.

Figure 9:
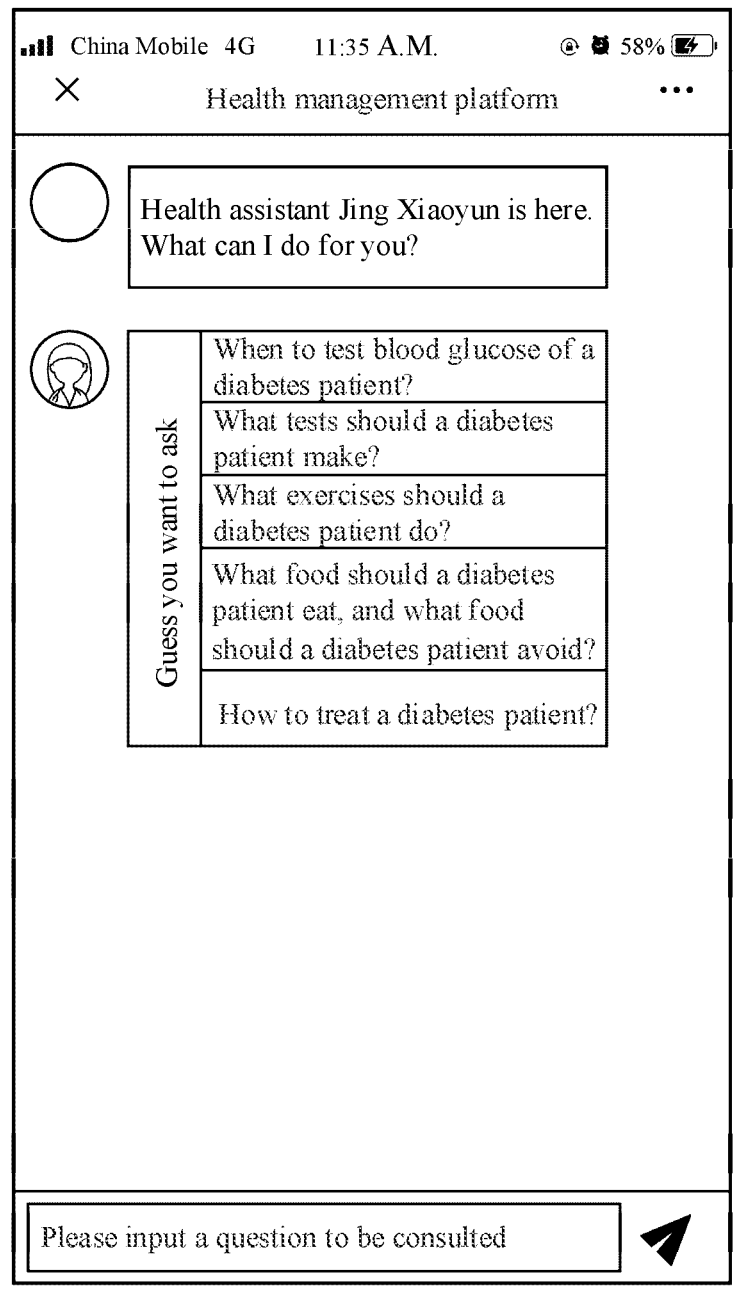
FIG. 9 is a schematic diagram of another user interaction interface according to an embodiment of the present disclosure.

For example, the query apparatus in the present disclosure may be an application software, which is disposed in a smartphone, and the application software provides a user interaction interface as shown in FIG. 9. Assuming that the number of preset recommendation questions is five, the third threshold value is 0.5, and the attribute information of the user includes: 29 years old, women, and diabetes, after the user opens the application software, the application software may acquire the attribute information of the user, determine the feature vector representation of the attribute information, and determine the second similarity between the feature vector representation and the feature vector representation of each standard question in the preset library of questions and answers. In the case that the second similarities between the feature vector representation of the attribute information and the standard questions identified with 1, 2, 3, 4, 5, and 6 are 0.6, 0.7, 0.9, 0.4, 0.75, and 0.77, five standard questions identified with 1, 2, 3, 5, and 6 may be taken as the recommendation questions, and provided to the user in the form shown in FIG. 9. The five standard questions identified with 1, 2, 3, 5, and 6 are "when to test blood glucose of a diabetes patient?" "what tests should a diabetes patient make?" "what exercises should a diabetes patient do?" "what food should a diabetes patient eat, and what food should a diabetes patient avoid?" "how to treat a diabetes patient?" As shown in FIG. 9, the application software may recommend these questions to the user.

In some exemplary embodiments, the user may select the question that the user is intended to query from the recommendation questions, so as to acquire the corresponding answer.

In this case, the query apparatus may acquire, based on the selection of the user, the corresponding answer from the preset library of questions and answers, and provide to the user.

That is, after S304, the method may further include the following processes.

In S305, a second select instruction of the user is acquired.

In S306, a recommendation question selected by the user is determined based on the second select instruction.

In S307, a fourth answer is acquired from the preset library of questions and answers based on the recommendation question selected by the user.

In S308, the fourth answer is provided to the user.

The query apparatus may provide the recommendation question in the user interaction interface, and the user may touch the question to be queried by a touch operation (such as tapping, long pressing, and the like) to trigger the second select instruction. The query apparatus may determine the recommendation question selected by the user based on the second select instruction upon acquisition of the second select instruction of the user, acquire the fourth answer from the preset library of questions and answers, and provide the fourth answer to the user.

In the embodiments of the present disclosure, it is noted that storage formats of the standard questions and the corresponding accurate answers in the preset library of questions and answers may be in a dictionary format. For example, in the case that the identification is "30," the question is "are dry mouth and a frequency of urination symptoms of diabetes?" and the answer is "dry mouth has many causes, and may be caused by poor diet, psychological and lifestyle habits, or may be caused by diseases such as diabetes characterized by excessive drinking, eating, urination and wasting. Patient should make further examination to confirm whether it is diabetes," the corresponding storage format may be {("qid:" "30," "question" "Are dry mouth and a frequency of urination symptoms of diabetes?" "answer:" "dry mouth has many causes, and may be caused by poor diet, psychological and lifestyle habits, or may be caused by diseases such as diabetes characterized by excessive drinking, eating, urination and wasting. Patient should make further examination to confirm whether it is diabetes"}. In the case that the user selects the recommendation question, the query apparatus may acquire the corresponding answer (that is, the "answer" field) corresponding to the question from the preset library of questions and answers, and provide the "answer" to the user.

In the case that the question of interest of the user is recommended to the user based on the attribute information of the user, the user can be directly selected the recommendation question to acquire the information of interest without inputting information, which saves the user time and improves the user experience.

It should be understood that, in the embodiments of the present disclosure, in the case that the user selects the recommendation question provided by the query apparatus, the query apparatus may provide the answer corresponding to the selected recommendation question to the user by the method described above. In some exemplary embodiments, the user may not select the recommendation question provided by the query apparatus, but input information to query information that the user is intended to learn about. In the embodiments of the present disclosure, the query apparatus may further provide an input prompt to the user based on the input information of the user, such that the user may query the information to be queried by directly selecting the prompt question, so as to further save the user time.

Figure 10:
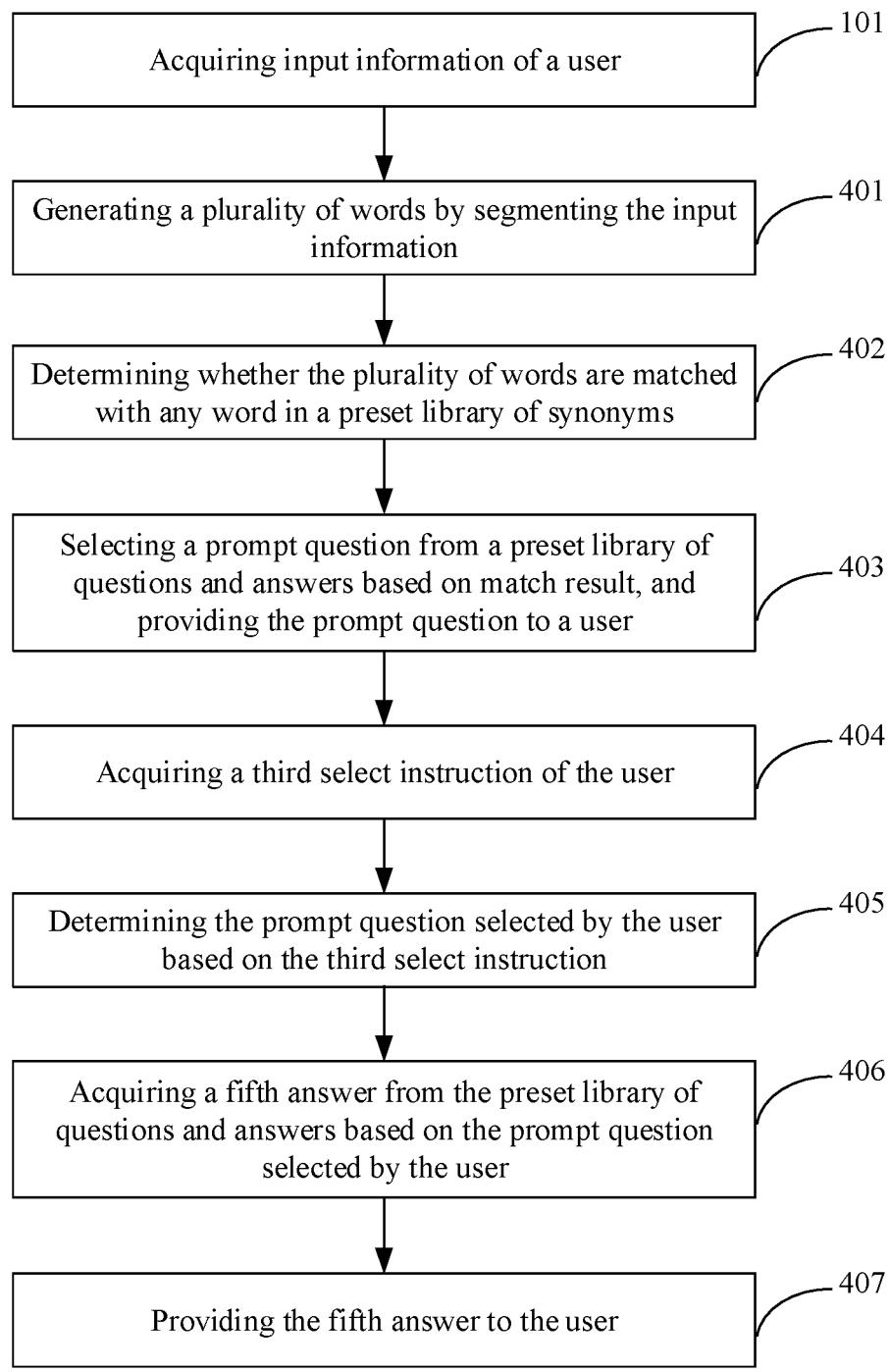
FIG. 10 is a flowchart of another method for querying questions according to an embodiment of the present disclosure.

That is, as shown in FIG. 10, after S101, the method may further include the following processes.

In S401, a plurality of words is generated by segmenting the input information.

In some exemplary embodiments, the input information may be input into a tokenizer to segment the input information into the plurality of words.

In S402, whether the plurality of words are matched with any word in a preset library of synonyms is determined.

A high-frequency word may be pre-selected from the preset library of questions and answers, and then a preset number of synonyms of the high-frequency words may be acquired from an open source word vector library to acquire a library of synonyms including a preset number of synonyms of each high-frequency word.

In S403, a prompt question is selected from the preset library of questions and answers based on the match result, and the prompt question is provided to the user.

In the case that a word in the plurality of words is matched with a synonym in the preset library of synonyms, the prompt question may be selected from the preset library of questions and answers based on the word in the plurality of words and the synonym of the word, and the prompt question is provided to the user. In the case that a word in the plurality of words is not matched with the synonyms in the preset library of synonyms, the prompt question may be selected from the preset library of questions and answers based on the word in the plurality of words, and the prompt question is provided to the user.

In some exemplary embodiments, after the plurality of words are generated by segmenting the input information, each of the plurality of words may be matched with the synonyms in the preset library of synonyms. In the case that the first word to be matched is named as word A, and the word A are not matched with the synonyms in the preset library of synonyms, the word A may be matched with the standard questions in the preset library of questions and answers to determine a fourth similarity of the word A and each standard questions in the preset library of questions and answers. In addition, a fourth threshold may be preset, such that a set of standard questions in the preset library of questions and answers that the fourth similarity of the standard questions and the word A is greater than the fourth threshold is taken as a first question library. In the case that the word A is matched with a synonym in the preset library of synonyms, and the synonym is named as word B, the word A and the word B may be matched with the standard questions in the preset library of questions and answers to determine the fourth similarity of the word A and each standard questions in the preset library of questions and answers, and the fourth similarity of the word B and the standard questions in the preset library of questions and answers, such that a set of standard questions in the preset library of questions and answers that the fourth similarity of the standard questions and the word A is greater than the fourth threshold, and a set of standard questions that the fourth similarity of the standard questions and the word B is greater than the fourth threshold are taken as the first question library.

A second word in the plurality of words may be matched with the synonyms in the preset library of synonyms in the same method, and the second word is word C. In the case that the word C is not matched with the synonyms in the preset library of synonyms, the word C may be matched with the standard questions in the first question library to determine a fifth similarity of the word C and each standard question in the first question library, such that a set of standard questions in the first question library that the fifth similarities of the standard questions and the word C are greater than the fourth threshold is taken as a second question library. In the case that the word C is matched with the synonym in the preset library of synonyms, and the synonym is named as word D, the word C and word D may be matched with the standard questions in the first question library to determine the fifth similarity of the word C and each standard question in the first question library, and the fifth similarity of the word D and each standard question in the first question library, such that a set of standard questions in the first question library that the fifth similarities of the standard questions and the word C are greater than the fourth threshold, and a set of standard questions in the first question library that the fifth similarities of the standard questions and the word D are greater than the fourth threshold are taken as the second question library.

The fourth similarity and the fifth similarity may be determined in accordance with a Jaccard distance algorithm, or other methods, which is not limited in the present disclosure.

Each word in the plurality of words is processed by the processes described above, until a question library is finally determined. The questions in the final determined question library may be taken as the prompt question and provided to the user.

It is noted that the first question library is the final question library in the case that the generated word is one after the input information of the user is segmented.

Figure 11:
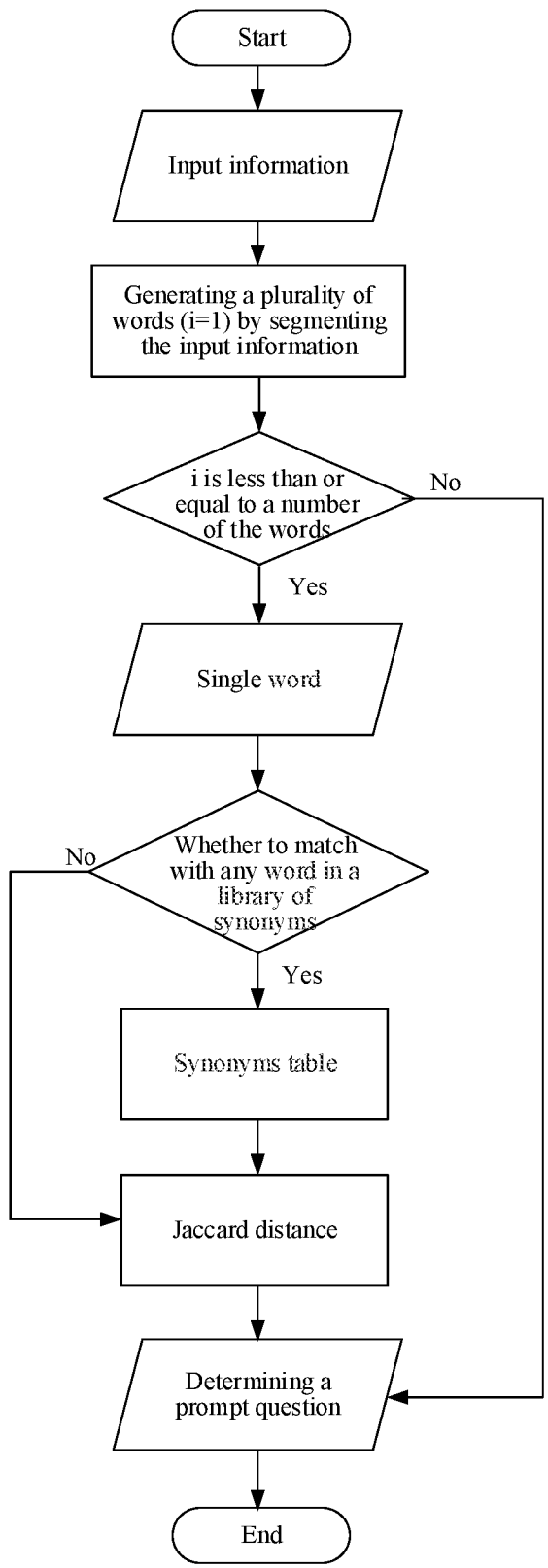
FIG. 11 is a flowchart of another method for querying questions according to an embodiment of the present disclosure.

As shown in FIG. 11, assuming that the input information is segmented to two words, for a first word A, that is, i is equal to one, the word A may be matched with any word in the library of synonyms. In the case that the word A are not matched with the synonyms in the library of synonyms, the word A may be matched with the standard questions in the preset library of questions and answers to determine a Jaccard distance between the word A and each standard question in the preset library of questions and answers, and the first question library is then determined based on the Jaccard distances. In the case that the word A is matched with the synonym in the preset library of synonyms, a synonyms table may be acquired, and the word A and the words in the synonyms table are matched with the standard questions in the preset library of questions and answers to determine the Jaccard distance between the word A and each standard question in the preset library of questions and answers, and the Jaccard distances between the words in the synonyms table and each standard question in the preset library of questions and answers. Then, the first question library is determined based on the Jaccard distances.

For the second word C, that is, i is equal to two, the word C may be matched with any word in the library of synonyms. In the case that the word C are not matched with the synonyms in the library of synonyms, the word C may be matched with the standard questions in the first question library to determine a Jaccard distance between the word C and each standard question in the first question library, and the second question library is then determined based on the Jaccard distances. In the case that the word C is matched with the synonym in the preset library of synonyms, a synonyms table may be acquired, and the word C and the words in the synonyms table are matched with the standard questions in the first question library to determine the Jaccard distance between the word C and each standard question in the first question library, and the Jaccard distances between the words in the synonyms table and each standard question in the preset first question library. Then, the second question library is determined based on the Jaccard distances.

When i is equal to three, the cycle is stopped, and the questions in the second question library may be taken as the prompt question, and provided to the user.

Figure 12:
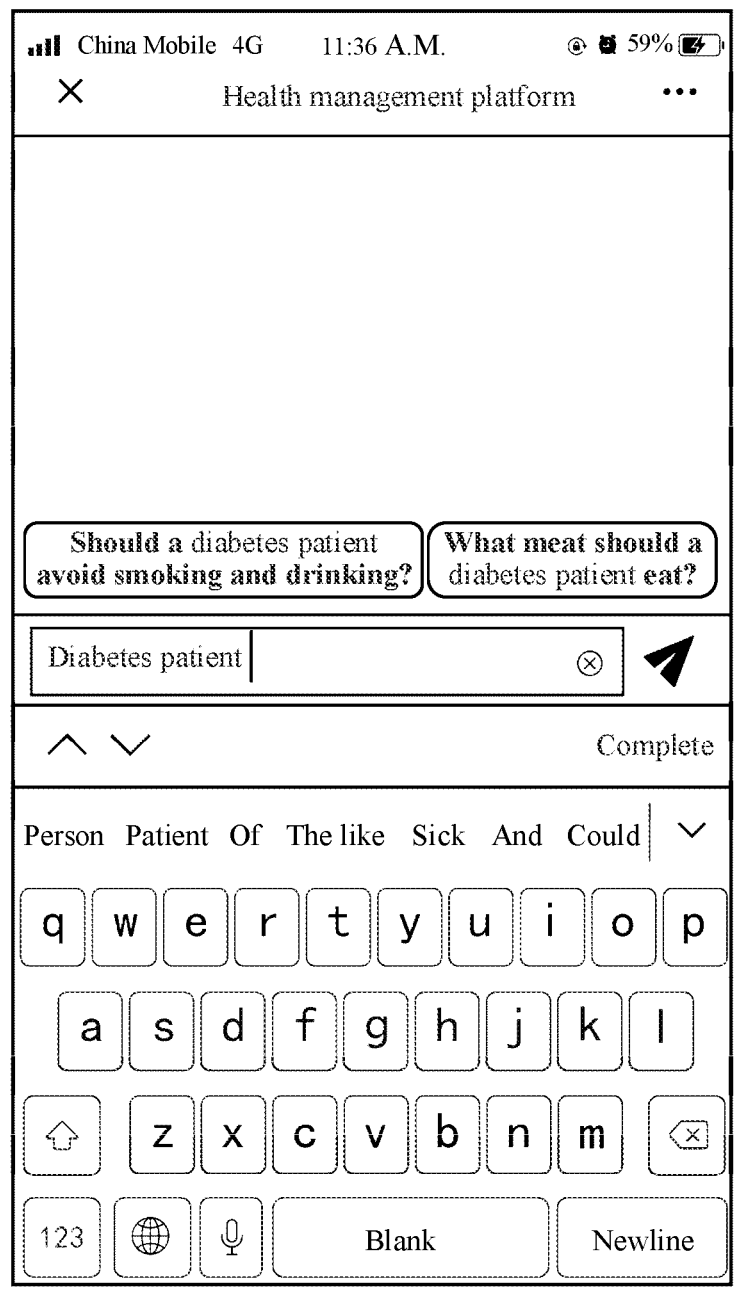
FIG. 12 is a schematic diagram of another user interaction interface according to an embodiment of the present disclosure.

For example, assuming that the fourth threshold is 0.5, the user does not select the recommendation question provided by the query apparatus, and the user inputs the word "diabetes" into the user interaction interface, the query apparatus may generate the word "diabetes" by segmenting the input information, and the query apparatus may determine whether the word "diabetes" is matched with any word in the preset library of synonyms. In the case that the word "diabetes" is not matched with the synonyms in the preset library of synonyms, the word "diabetes" may be matched with the standard questions in the preset library of questions and answers to determine the fourth similarity of the word "diabetes" and each standard question in the preset library of questions and answers. In the case that the standard question in the preset library of questions and answers that the fourth similarity of the standard question and the word "diabetes" is greater than the fourth threshold includes "should a diabetes patient avoid smoking and drinking?" and "what meat should a diabetes patient eat?," the two prompt questions may be provided to the user as shown in FIG. 12. As shown in FIG. 12, the query apparatus in the present disclosure may be an application software disposed in a smart phone, and the application software may provide a user interaction interface. In the case that the user inputs the word "diabetes" into the interaction interface, the application software determines that the standard question in the preset library of questions and answers that the fourth similarity of the standard question and the word "diabetes" is greater than the fourth threshold includes "should a diabetes patient avoid smoking and drinking?" and "what meat should a diabetes patient eat?" and the application software may be taken the two questions as the prompt questions, and provided the prompt questions to the user.

In some exemplary embodiments, the user may select the question to be queried from the prompt questions to acquire the corresponding answer. In this case, the query apparatus may acquire, based on the selection of the user, the corresponding answer from the preset library of questions and answers, and provide the corresponding answer to the user. That is, after S404, the method may further include the following processes.

In S404: a third select instruction of the user is acquired.

In S405, a prompt question selected by the user is determined based on the third select instruction.

In S406, a fifth answer is acquired from the preset library of questions and answers based on the prompt question selected by the user.

In S407, the fifth answer is provided to the user.

In particular, the query apparatus may provide the prompt question in the user interaction interface, and the user may touch the question to be queried by a touch operation (such as tapping, long pressing, and the like) to trigger the third select instruction. The query apparatus may determine the prompt question selected by the user based on the third select instruction upon acquisition of the third select instruction of the user, acquire the fifth answer from the preset library of questions and answers, and provide the fifth answer to the user.

In the embodiments of the present disclosure, it is noted that storage formats of the standard questions and the corresponding accurate answers in the library of questions and answers may be in a dictionary format. For example, in the case that the identification is "30," the question is "are dry mouth and a frequency of urination symptoms of diabetes?" and the answer is "dry mouth has many causes, and may be caused by poor diet, psychological and lifestyle habits, or may be caused by diseases such as diabetes characterized by excessive drinking, eating, urination and wasting. Patient should make further examination to confirm whether it is diabetes," the corresponding storage format may be {"qid:" "30," "question" "Are dry mouth and a frequency of urination symptoms of diabetes?" "answer:" "dry mouth has many causes, and may be caused by poor diet, psychological and lifestyle habits, or may be caused by diseases such as diabetes characterized by excessive drinking, eating, urination and wasting. Patient should make further examination to confirm whether it is diabetes" }. In the case that the user selects the prompt question, the query apparatus may match the corresponding answer (that is, the "answer" field) from the preset library of questions and answers corresponding to the question, and provide the "answer" field to the user.

It should be understood that, in the embodiments of the present disclosure, in the case that the user selects the prompt question provided by the query apparatus, the query apparatus may provide an answer corresponding to the selected prompt question to the user by the method described above. In the case that the user does not select the prompt question provided by the query apparatus, the query apparatus may provide the corresponding answer to the user based on the input information of the user by the method shown in FIG. 1.

By providing the input prompt to the user based on the input information of the user, the user may query the information to be queried by directly selecting the prompt question, so as to further save the user time. In addition, as the prompt question is acquired based on the word in the input information of the user and the synonym in the library of synonyms in the case that the library of synonyms includes the synonyms having similar meaning with the word in the input information of the user, a question semantically similar to the input information may be acquired in the preset library of questions and answers, and provided to the user, such that the provided prompt information is more accurate and complete.

It can be seen from the above analysis that, in the present disclosure, in the case that the corresponding answer is provided to the user based on the input information of the user, the intention information of the user needs to be acquired based on the input information of the user, and the first candidate question most closely matched with the input information of the user is selected, based on the input information and the intention information, from the preset library of questions and answers. Furthermore, the candidate answer corresponding to the first candidate question is taken as the second answer, and the first answer is generated based on the credibility of the second answer and the second answer, and provided to the user. However, in the specific implementation, the input information of the user may be relatively long, and the input information includes redundant information. Or the input information of the user may be short, and the input information does not include the key information for acquisition of the first candidate answer from the preset library questions and questions. In this case, it is difficult to accurately acquire the first candidate question from the preset library of questions and answers.

Thus, for the above situation, the method for querying questions is further described hereinafter in conjunction with FIG. 13.

Figure 13:
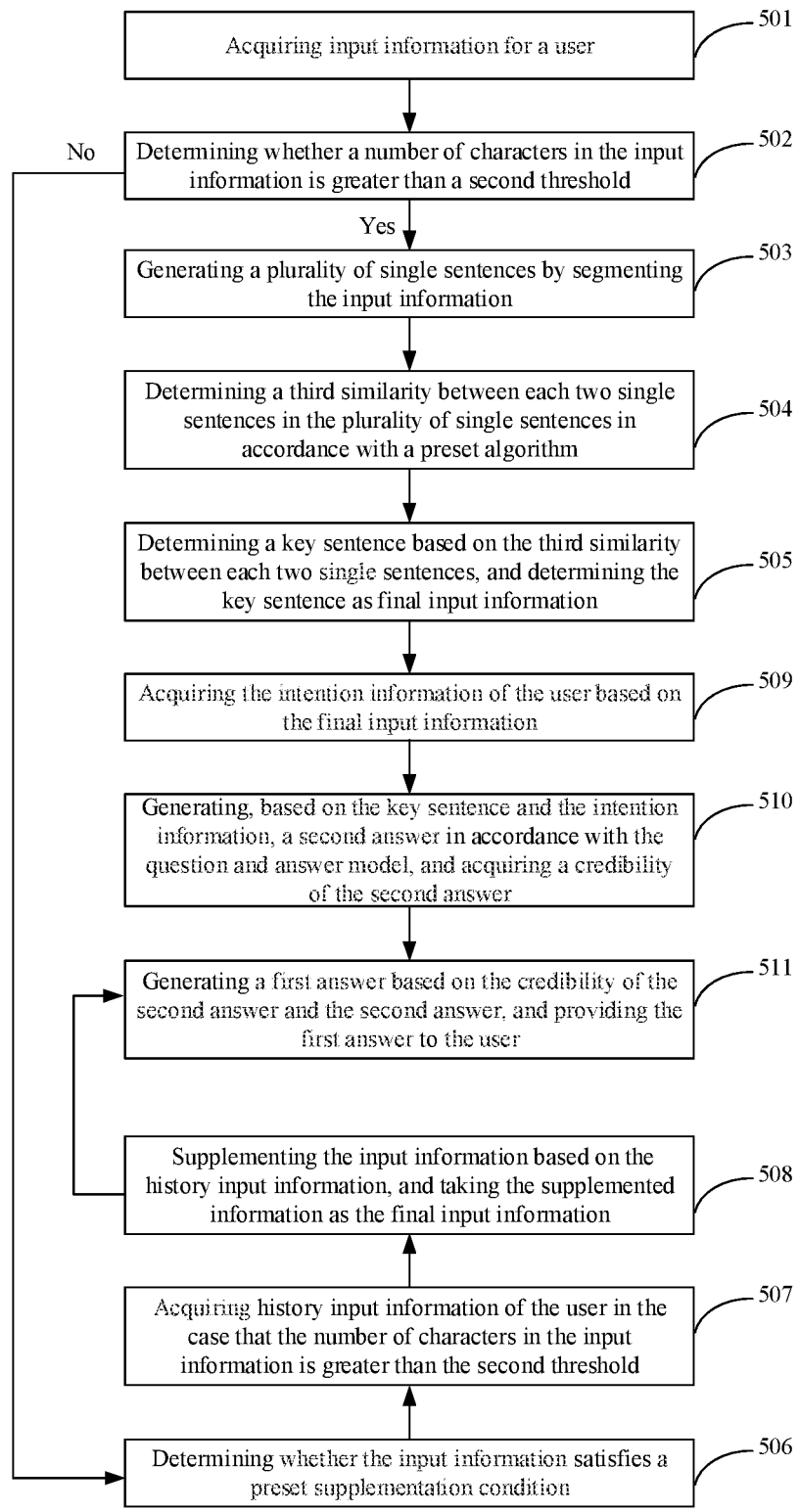
FIG. 13 is a flowchart of another method for querying questions according to an embodiment of the present disclosure.

FIG. 13 is a flowchart of a method for querying questions according to another embodiment of the present disclosure.

As shown in FIG. 13, the method for querying questions provided in the embodiments of the present disclosure includes the following processes.

In S501, input information of a user is acquired.

In S502, whether a number of characters in the input information is greater than a second threshold is determined, wherein in the case that the number of characters in the input information is greater than the second threshold, S503 is performed, and in the case that the number of characters in the input information is not greater than the second threshold, S506 is performed.

In S503, a plurality of single sentences are generated by segmenting the input information.

In S504, a third similarity between each two single sentences in the plurality of single sentences is determined in accordance with a preset algorithm.

In S505, a key sentence is determined based on the third similarity between each two single sentences, and the key sentence is determined as final input information.

It should be understood that in the case that the input information of the user is relatively long, it may include redundant information. For example, in the case that the input information input by the user in the voice form is "dear expert, I am from Jiangsu province. My surname is Chen. I am a male with 180 cm tall, 80 kg in weight and 60 years old. I have suffered from diabetes for more than 10 years. My pre-prandial blood glucose is 7-8 mmol/L and postprandial blood glucose is 14-15 mmol/L. A drug I take is metformin. I would like to ask why my postprandial blood glucose is still high in the case that I have taken the drug normally and controlled my diet? Please answer me, thank you!" it can be seen that the input information includes the redundant information: "thank you," and "I am from Jiangsu province." Thus, it is difficult to accurately acquire the first candidate question from the preset library of questions and answers, and an accurate answer cannot be provided to the user. In the embodiments of the present disclosure, the input information may be compressed in the case that the input information of the user is relatively long, so as to generate the first answer based on the compressed information.

In the embodiments of the present disclosure, the second threshold may be preset.

In the case that the number of characters included in the input information is greater than the second threshold, the length of the input information is determined to be longer with including the redundant information. Thus, the input information may be compressed by performing processes S503 to S505 to extract the most important key sentence from the input information, and the key sentence is taken as the final input information to generate the first answer based on the final input information.

The second threshold may be arbitrarily set as required. For example, the second threshold may be set as 30, 25, and the like.

In some exemplary embodiments, a TextRank algorithm may be used to automatically select the most important sentence in the input information of the user as the key sentence.

In the specific implementation, the input information may be pre-processed. The input information may be segmented into a plurality of single sentences, each single sentence is segmented into words, and stop words are removed. The input information T is segmented to acquire $T=[S_1, S_2, \ldots, S_m]$ wherein $S_1, S_2 \ldots S_m$ represent each single sentence. After the single sentence $S_i$ is segmented into words, and stop words are removed, $S_i=[t_{i,1}, t_{i,2}, \ldots, t_{i,n}]$ may be acquired, wherein $t_{i,j} \in S_j$ is the remained candidate keyword.

Then, the third similarity between each two single sentences may be determined in accordance with a preset algorithm. The third similarity Similarity($S_i$, $S_j$) between single sentences $S_i$ and $S_j$ may be determined based on a content coverage between the single sentences in accordance with the algorithm shown in equation (1) below:

$$\text{Similarity }(S_i, S_j) = \frac{|\{t_k \mid t_k \in S_i \,\&\, t_k \in S_j\}|}{\log(|S_j|) + \log(|S_j|)} \quad (1)$$

In addition, the fifth threshold may be preset. If the third similarity between the two single sentences is greater than the preset fifth threshold, the two single sentences may be considered to be semantically related. Thus, the two single sentences may be connected, and the third similarity between the two single sentences may be taken as the weight of the edge. For example, in the case that the third similarity between single sentences $S_i$ and $S_j$ is greater than the fifth threshold, the single sentences $S_i$ and $S_j$ are connected, and the weight of the edge $w_{ji}$=Similarity($S_i$, $S_j$). According to above equation (1), the weights of each two single sentences of the plurality of single sentences may be iteratively calculated.

The fifth threshold may be arbitrarily set as required. For example, the fifth threshold may be set as five, six, and the like.

The sentences may be ordered based on the weight of each two single sentences, a preset number of most important single sentences are taken as the key sentences, and the key sentences are taken as the final input information. The preset number may be set as required. For example, three or four most important single sentences may be taken as the key sentences, and the like.

The key sentences are extracted in the case that the input information of the user is relatively long, and the key sentences are taken as the final input information to determine a corresponding first answer, which avoids the problem of failure of accurately determining the question corresponding to the answer due to the redundant information caused by long input information.

In S506, whether the input information satisfies a preset supplementation condition is determined.

In S507, history input information of the user is acquired in the case that the number of characters in the input information is greater than the second threshold.

In S508, the input information is supplemented based on the history input information, and the supplemented information is taken as the final input information.

It should be understood that the input information of the user may be relatively short, and the input information may not include the key information for acquisition of the first candidate answer from the preset library questions and questions. For example, the user first input "What are the symptoms of diabetes?" and the user further inputs "how to prevent?" after the query apparatus provides the answer. In this case, as "how to prevent?" does not include the disease entity for acquisition of the first candidate answer from the preset library questions and questions, it is difficult to accurately acquire the first candidate question from the preset library questions and questions. Thus, an accurate answer cannot be provided to the user. In the embodiments of the present disclosure, whether the input information needs to be supplemented in the case that the input information of the user is relatively short, and in the case that the input information needs to be supplemented, the first answer is generated based on the supplemented information.

The preset supplementation condition is used to determine whether the input information of the user is complete. In the case that the input information of the user satisfies the preset supplementation condition, the input information of the user is incomplete. And in the case that the input information of the user does not satisfy the preset supplementation condition, the input information of the user is complete and does not need to be supplemented. The preset supplementation condition may be set as required. In addition, the number of conditions included in the preset supplementation condition may be one or more, which is not limited in the present disclosure.

In some embodiments of the present disclosure, the preset supplementation condition may include three conditions: first, none of the entities are present; second, the disease entity is not present, and other entities are present: third, only the disease entity is present, and the length of the sentence is less than a sixth threshold.

Figure 14:
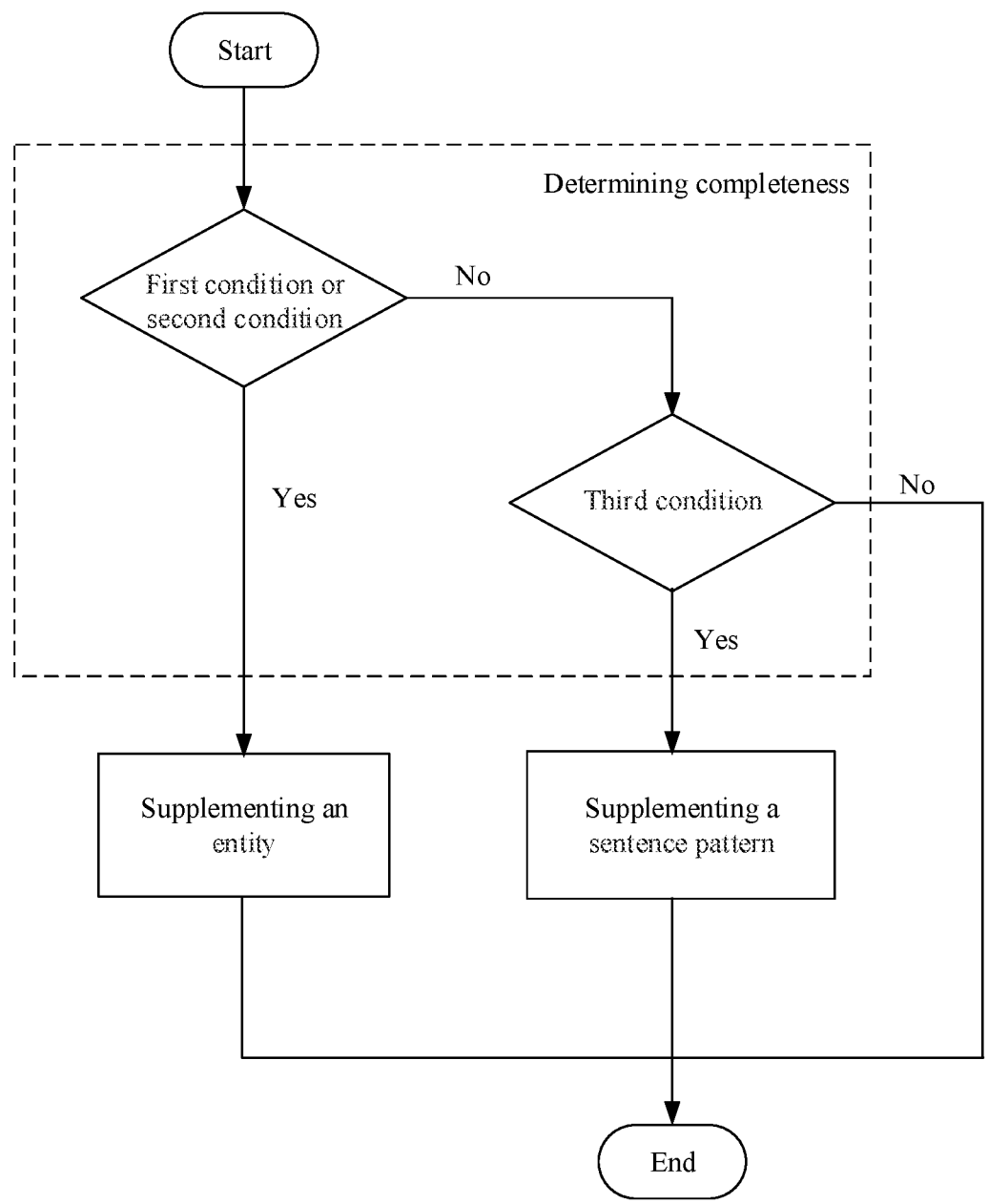
FIG. 14 is a flowchart of another method for querying questions according to an embodiment of the present disclosure.

In the specific implementation, as shown in FIG. 14, whether the input information satisfies a first condition and a second condition may be determined. In the case that the input information satisfies the first condition or the second condition, the input information is incomplete, the entity is missing, and the corresponding entity is required to be supplemented. In the case that the input information satisfies neither the first condition nor the second condition, whether the input information of the user satisfies a third condition is determined. In the case that the input information satisfies the third condition, the input information of the user is incomplete, and the corresponding sentence pattern needs to be supplemented. In the case that the input information does not satisfy the first condition, the second condition, and the third condition, the input information of the user is complete and needs no supplementation, the input information of the user is the final input information, and the query apparatus may generate the first answer based on the input information of the user.

For example, the user first inputs "could a diabetes patient eat an apple?" and then inputs "how to prevent?" As "how to prevent" satisfies the first condition, that is, none of the entities are present, the disease entity "diabetes" or the food entity "apple" may be supplemented in "how to prevent"

based on the first input information of the user, such that "how to prevent diabetes?" and "how to prevent an apple?" are acquired.

Alternatively, assuming that the sixth threshold is seven, the user first inputs "how to prevent elderly diabetes?" and after the query apparatus provides the answer, the user inputs "how about gestational diabetes?" As the "how about gestational diabetes?" does not satisfy the first condition and the second condition, but satisfies the third condition, the sentence pattern needs to be supplemented, and "how about gestational diabetes?" may be supplemented as "how to prevent gestational diabetes?"

It should be understood that after the input information is supplemented based on the history input information, the supplemented information may be provided to the user to determine the final input information based on the selection of the user. For example, in the case that the user selects "how to prevent diabetes?" from "how to prevent diabetes?" and "how to prevent an apple?" "how to prevent diabetes?" is taken as the final input information.

It is noted that if the user does not select the supplemented information provided by the query apparatus, the input information of the user may be determined to be complete, and is not necessary to be supplemented, such that the first answer is generated directly based on the input information of the user.

In the case that the input information of the user is short, the input information of the user is supplemented for different situations based on the history input information, and the corresponding first answer is determined based on the supplemented information, such that the query apparatus can better understand the context information, and the problem of the failure of accurately determining the question corresponding to the answer due to the miss information caused by short input information may be avoid.

The first answer may be generated based on the final input information by the following processes.

In S509, the intention information of the user is acquired based on the final input information.

In S510, the second answer is generated based on the key sentence and the intention information in accordance with the question and answer model, and the credibility of the second answer is acquired.

In S511, the first answer is generated based on the credibility of the second answer and the second answer, and provided to the user.

The specific implementation and principles of processes S509 to S511 may be referred to the detailed description of the above embodiments, which is not repeated herein.

In the method for querying questions in the embodiments of the present disclosure, in the case that the number of characters included in the input information is greater than the second threshold, the plurality of single sentences may be generated by segmenting the input information, and the third similarity between each two single sentences in the plurality of single sentences is determined in accordance with the preset algorithm. The key sentence is determined based on the third similarity between each two single sentences, and the key sentence is determined as the final input information. In the case that the number of characters included in the input information is not greater than the second threshold, whether the input information satisfies the preset supplementation condition is determined. In the case that the number of characters in the input information is greater than the second threshold, the history input information of the user is acquired, the input information is supplemented based on the history input information, and the supplemented information is taken as the final input information. The intention information of the user is acquired based on the final input information, the second answer is generated based on the key sentence and the intention information in accordance with the question and answer model, and the credibility of the second answer is acquired. In addition, the first answer is generated based on the credibility of the second answer and the second answer, and provided to the user. Thus, automatically providing corresponding accurate answer to the user based on the input information of the user may be achieved, the time and effort of the user are saved, and user experience is improved.

The method for querying questions provided in the present disclosure is further described hereinafter in conjunction with FIGS. 15, 4, 7, 9, 12. It is noted that the embodiments of the present disclosure are illustrated by taking the query apparatus being an application software disposed in a smartphone as an example. The application software may provide a user interaction interface, such that the user may query the answer of the question through the interaction interface.

Figure 15:
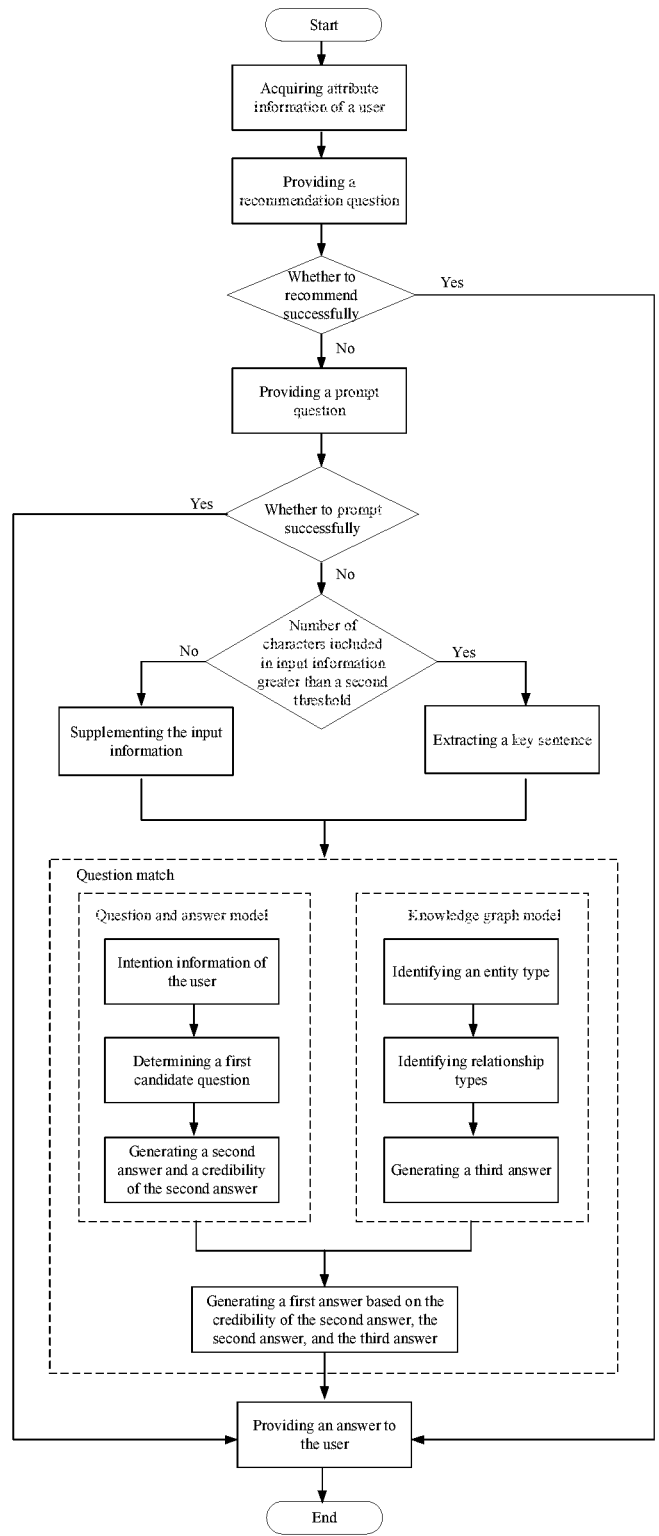
FIG. 15 is a flowchart of another method for querying questions according to an embodiment of the present disclosure.

FIG. 15 is a flowchart of a method for querying questions according to another embodiment of the present disclosure.

As shown in FIGS. 15 and 9, after the user turns on the application software, the application software may acquire the attribute information of the user and determine the feature vector representation of the attribute information, and determine the second similarity between the feature vector representation of the attribute information and the feature vector representation of each standard question in the preset library of questions and answers. The recommendation question is provided to the user based on the second similarity.

After the user selects a recommendation question from the recommendation questions to trigger the second select instruction (that is, the recommendation is successful), the application software may determine the recommendation question selected by the user based on the second select instruction, acquire the "answer" field corresponding to the recommendation question selected by the user from the preset library of questions and answers as the fourth answer, and provide the fourth answer to the user based on the recommendation question selected by the user. For example, if the user selects "what tests should a diabetes patient make?" in FIG. 9, the application software may acquire the answer corresponding to the question from the preset library of questions and answers, and provide the answer to the user.

If the user does not select any of the recommendation questions, but inputs the information (that is, the recommendation is unsuccessful), the plurality of words is generated by segmenting the input information, whether the plurality of words are matched with any word in the preset library of synonyms is determined, the prompt question is selected from the preset library of questions and answers based on the match result, and the prompt question is provided to the user. For example, in the case that the user does not select the recommendation question in FIG. 9, but inputs "diabetes" into the interaction interface, the application software may segment "diabetes." As "diabetes" is only one word, the application software may determine whether "diabetes" is matched with any word in the preset library of synonyms, and the prompt question is selected from the preset library of questions and answers based on the match result. Assuming that the prompt question selected by the application software includes "should a diabetes patient avoid smoking and drinking?" and "what meat should a diabetes patient eat?" the application software may provide the two questions to the user as shown in FIG. 12.

After the user selects a prompt question from the prompt questions to trigger the third select instruction (that is, the prompt is successful), the prompt question selected by the user may be determined based on the third select instruction. The "answer" field corresponding to the prompt question selected by the user is acquired from the preset library of questions and answers as the fifth answer, and the fifth answer is provided to the user based on the prompt question selected by the user. For example, the user selects "what meat should a diabetes patient eat?" in FIG. 12, the application software may acquire the answer corresponding to the question from the preset library of questions and answers, and provide the answer to the user.

If the user does not select any of the question questions (that is, the prompt is unsuccessful), whether the number of characters included in the input information is greater than the second threshold may be determined. In the case that the number of characters in the input information is greater than the second threshold, the plurality of single sentences are generated by segmenting the input information. The third similarity between each two single sentences in the plurality of single sentences is determined in accordance with the preset algorithm, the key sentence is determined based on the third similarity between each two single sentences, and the key sentence is determined as the final input information.

In the case that the number of characters included in the input information is not greater than the second threshold, whether the input information satisfies the preset supplementation condition is determined. The history input information of the user is acquired in the case that the number of characters in the input information is greater than the second threshold, the input information is supplemented based on the history input information, and the supplemented information is taken as the final input information.

Then, the intention information of the user may be acquired based on the final input information, and the first candidate question is determined based on the input information and the intention information of the user in accordance with the question and answer model. The "answer" field corresponding to the first candidate question is acquired from the preset library of questions and answers and taken as the second answer, and the credibility of the second answer is acquired.

The entity type and relationship type in the final input information may be identified, and the third answer is generated based on the entity type and relationship type by querying the knowledge graph model.

The second answer is taken as the first answer in the case that the credibility of the second answer is greater than the first threshold, and whether the third answer is generatable based on the input information in accordance with the knowledge graph model is further determined in the case that the credibility of the second answer is less than or equal to the first threshold. The third answer is taken as the first answer in the case that the credibility of the second answer is less than or equal to the first threshold and the third answer is generatable in accordance with the knowledge graph model, and the second answer is taken as the first answer in the case that the credibility of the second answer is less than or equal to the first threshold and the third answer is not generatable in accordance with the knowledge graph model, such that the first answer may be provided to the user.

Assuming that the user does not select any of the prompt questions shown in FIG. 12, but inputs "how to prevent diabetes?" into the interaction interface as shown in FIG. 4, the application software determines that the second answer is "1. No overeating, regular life, chewing food in eating, eating more vegetables . . . " and the credibility of the second answer is greater than the first threshold, the application software may determine the second answer as the first answer and provide to the user as shown in FIG. 4.

Assuming that the user does not select any of the prompt questions shown in FIG. 12, but inputs "could a diabetes patient eat an apple" into the interaction interface as shown in FIG. 7, the application software determines the second answer with the credibility less than the first threshold, and the application software determines that the third answer is "diabetes is a set of metabolic diseases characterized by hyperglycemia. The hyperglycemia is caused by an insulin secretion defect or bio-effect damage, or both. The hyperglycemia in the diabetes causes chronic damage and dysfunction of various tissues, especially eyes, kidneys, heart, blood vessels, and nerves. An apple may be ate appropriately because the apple may reduce blood glucose content and prevent diabetes," the application software may determine the third answer as the first answer and provide to the user as shown in FIG. 7.

According to the processes described above, automatically providing corresponding accurate answer to the user based on the input information of the user may be achieved, and the time and effort of the user are saved. In addition, in the case that the second answer may be not accurate due to less data amount stored in the library of questions and answers, the final first answer may be determined by combining the question and answer model and the knowledge graph model, thereby increasing the accuracy of the determined first answer.

The apparatus for querying question in the embodiments of the present disclosure is described hereinafter with reference to FIG. 16.

Figure 16:
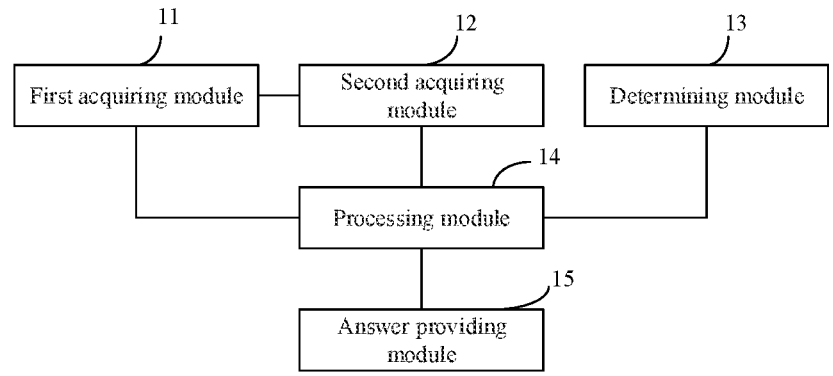
FIG. 16 is a schematic structural diagram of an apparatus for querying question according to an embodiment of the present disclosure.

FIG. 16 is a schematic diagram of an apparatus for querying question according to an embodiment of the present disclosure.

As shown in FIG. 16, the apparatus for querying question includes a first acquiring module 11, a second acquiring module 12, a determining module 13, a processing module 14, and an answer providing module 15.

A first acquiring 11 is configured to acquire input information of a user;

The second acquiring module 12 is configured to acquire intention information of the user based on the input information of the user:

A determining module 13 is configured to determine an answer generation rule:

The processing module 14 is configured to generate, based on the input information and the intention information, a first answer in accordance with the answer generation rule; and The answer providing module 15 is configured to provide the first answer to the user.

In particular, the apparatus for querying question (hereinafter referred to as a query apparatus) provided in the embodiments of the present disclosure may perform the method for querying questions provided in the embodiments of the present disclosure. The query apparatus may be configured in a terminal device provided in the embodiments of the present disclosure to automatically provide a corresponding accurate answer to the user based on the input information of the user. In the embodiments, the terminal device may be any hardware device with a function of data processing, such as a smartphone, a tablet, a personal digital assistant, or the like, which is not limited in the present disclosure.

In some exemplary embodiments, in the case that the answer generation rule is a first rule, the processing module 14 is configured to:

generate, based on the input information and the intention information, a second answer in accordance with a question and answer model, and acquire a credibility of the second answer; and generate the first answer based on the credibility of the second answer and the second answer.

In some exemplary embodiments, in the case of generating the first answer based on the credibility of the second answer and the second answer, the processing module 14 is configured to;

take the second answer as the first answer in the case that the credibility of the second answer is greater than a first threshold;

further determine whether a third answer is generatable based on the input information in accordance with a knowledge graph model in the case that the credibility of the second answer is less than or equal to the first threshold;

take the third answer as the first answer in the case that the credibility of the second answer is less than or equal to the first threshold and the third answer is generatable in accordance with the knowledge graph model; and take the second answer as the first answer in the case that the credibility of the second answer is less than or equal to the first threshold and the third answer is not generatable in accordance with the knowledge graph model.

In some exemplary embodiments, the second acquiring module 12 is configured to:

acquire a feature vector representation of the input information; and input the feature vector representation of the input information into an intention prediction model to acquire the intention information of the user.

In some exemplary embodiments, in the case of generating, based on the input information and the intention information, the second answer in accordance with the question and answer model, and acquiring the credibility of the second answer, the processing module 14 is configured to:

acquire the feature vector representation of the input information;

acquire a set of candidate questions corresponding to the intention information from a preset library of questions and answers;

acquire a feature vector representation of each candidate question in the set of candidate questions:

calculate a first similarity between the feature vector representation of the input information and the feature vector representation of each candidate question in accordance with the question and answer model;

select a first candidate question from the set of candidate questions based on the first similarity between the feature vector representation of the input information and the feature vector representation of each candidate question; and take a candidate answer corresponding to the first candidate question in the library of questions and answers as the second answer, wherein the first similarity between the feature vector representation of the input information and the feature vector representation of the selected first candidate question is the credibility of the second answer.

In some exemplary embodiments, in the case that the answer generation rule is a second rule, the processing module 14 is configured to:

determine whether the intention information includes food;

determine whether a second answer is generatable based on the input information in accordance with a question and answer model in the case that the intention information does not includes food;

take the second answer as the first answer in the case that the second answer is generatable in accordance with the question and answer model;

determine whether a third answer is generatable based on the input information in accordance with a knowledge graph model in the case that the intention information includes food;

take the third answer as the first answer in the case that the third answer is generatable in accordance with the knowledge graph model;

generate, based on the input information, the third answer in accordance with the knowledge graph model in the case that the second answer is not generatable in accordance with the question and answer model, and take the third answer as the first answer; and generate, based on the input information, the second answer in accordance with the question and answer model in the case that the third answer is not generatable in accordance with the knowledge graph model.

In some exemplary embodiments, prior to determining whether the intention information includes food, the processing module 14 may be further configured to:

determine whether the second answer is generatable in accordance with the question and answer model or the third answer is generatable based on the input information in accordance with the knowledge graph model; and acquire a set of candidate questions corresponding to the intention information from a preset library of questions and answers in the case that the second answer is not generatable in accordance with the question and answer model, and the third answer is not generatable in accordance with the knowledge graph model, and provide candidate questions in the set of candidate questions to the user.

In some exemplary embodiments, in the case of generating, based on the input information and the intention information, the second answer in accordance with the question and answer model, the processing module 14 is configured to:

acquire a feature vector representation of the input information;

acquire a set of candidate questions corresponding to the intention information from a preset library of questions and answers;

acquire a feature vector representation of each candidate question in the set of candidate questions;

calculate a first similarity between the feature vector representation of the input information and the feature vector representation of each candidate question:

determine one or more candidate questions from the set of candidate questions based on the first similarity between the feature vector representation of the input information and the feature vector representation of each candidate question;

take a candidate answer corresponding to a candidate question in the library of questions and answers as the second answer in the case that the candidate question is determined;

provide a plurality of candidate questions to the user in the case that the plurality of candidate questions are determined:

acquire a first select instruction of the user;

determine a candidate question selected by the user based on the first select instruction; and take a candidate answer corresponding to the candidate question selected by the user from the library of questions and answers as the second answer.

In some exemplary embodiments, the query apparatus may further include:

a third processing module, configured to identify an entity type and a relationship type in the input information; and generate the third answer based on the entity type and relationship type by querying the knowledge graph model;

a third acquiring module, configured to acquire attribute information of the user;

a first determining module, configured to determine a feature vector representation of the attribute information;

a second determining module, configured to determine a second similarity between the feature vector representation of the attribute information and the feature vector representation of each standard question in the preset library of questions and answers; and a first recommending module, configured to provide a recommendation question to the user question based on the second similarity.

In some exemplary embodiments, the query apparatus may further include:

a fourth acquiring module, configured to acquire a second select instruction of the user;

a third determining module, configured to determine a recommendation question selected by the user based on the second select instruction;

a fifth acquiring module, configured to acquire a fourth answer from the preset library of questions and answers based on the recommendation question selected by the user; and the answer providing module, further configured to provide the fourth answer to the user.

In some exemplary embodiments, the query apparatus may further include:

a fourth processing module, configured to generate a plurality of words by segmenting the input information;

a first determining module, configured to determine whether the plurality of words are matched with any word in a preset library of synonyms; and a second recommending module, configured to select a prompt question from the preset library of questions and answers based on the match result, and provide the prompt question to the user.

In some exemplary embodiments, the query apparatus may further include:

a sixth acquiring module, configured to acquire a third select instruction of the user;

a fourth determining module, configured to determine the prompt question selected by the user based on the third select instruction;

a seventh acquiring module, configured to acquire a fifth answer from the preset library of questions and answers based on the prompt question selected by the user; and the answer providing module, further configured to provide the fifth answer to the user.

In some exemplary embodiments, the query apparatus may further include:

a second determining module, configured to determine whether a number of characters in the input information is greater than a second threshold;

a fifth processing module, configured to generate a plurality of single sentences by segmenting the input information in the case that the number of characters in the input information is greater than the second threshold;

a fifth determining module, configured to determine a third similarity between each two single sentences in the plurality of single sentences in accordance with a preset algorithm; and a sixth determining module, configured to determine a key sentence based on the third similarity between each two single sentences, and determine the key sentence as final input information.

In some exemplary embodiments, the query apparatus may further include:

a third determining module, configured to determine whether the input information satisfies a preset supplementation condition in the case that the number of characters in the input information is not greater than the second threshold;

an eighth acquiring module, configured to acquire history input information of the user in the case that the input information satisfies the preset supplementation condition; and a supplementing module, configured to supplement the input information based on the history input information, and take the supplemented information as the final input information.

It is noted that the description of the method for querying questions is also applicable to the apparatus for querying question provided in the embodiments of the present disclosure, which is not repeated herein.

In the apparatus for querying question in the embodiments of the present disclosure, the second answer is generated based on the input information and the intention information of the user in accordance with the answer generation rule, the final answer is generated based on the second answer and the credibility of the second answer, and the final answer is provided to the user, thereby achieving automatically providing corresponding accurate answer to the user based on the input information of the user, saving the time and effort of the user, and improving the user experience.

In order to implement the embodiments described above, the present disclosure further provides a terminal device.

Figure 17:
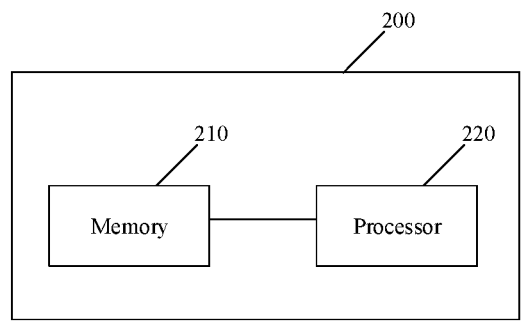
FIG. 17 is a schematic structural diagram of a terminal device according to an embodiment of the present disclosure.

FIG. 17 is a schematic structural diagram of a terminal device according to an embodiment of the present disclosure. The terminal device shown in FIG. 17 is merely an example, which is not intended to limit the function and scope of the embodiments of the present disclosure.

As shown in FIG. 17, the terminal device 200 includes a memory 210, a processor 220, and a computer program stored on the memory 210 and executable on the processor 220.

The processor 220, when executing the program, is caused to perform the method for querying questions described in the above embodiments.

Figure 18:
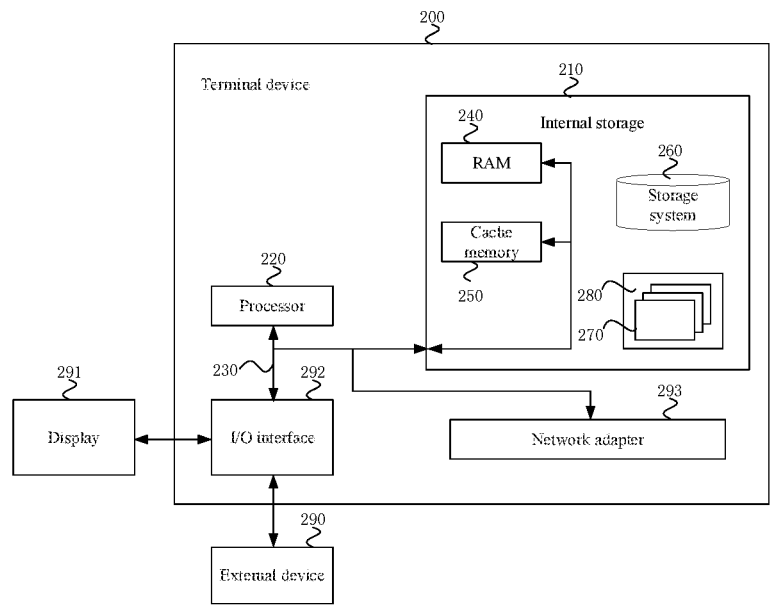
FIG. 18 is a schematic structural diagram of another terminal device according to an embodiment of the present disclosure.

In some optional embodiments, as shown in FIG. 18, the terminal device 200 may further include the memory 210, and the processor 220, and a bus 230 connecting different components (including the memory 210 and the processor 220). The memory 210 stores a computer program. The processor 220, when executing the program, is caused to perform the method for querying questions described in the embodiments.

The bus 230 represents one or more of several types of bus structures, and includes a memory bus, or a memory controller, a peripheral bus, an accelerated graphics port, a processor, or a local bus using several types of bus structures. For example, the structure includes, but is not limited to, an industry standard architecture (ISA) bus, a micro channel architecture (MCA) bus, an enhanced ISA (EISA)

bus, a video electronics standards association (VESA) local bus, and a peripheral component interconnects (PCI) bus.

Typically, the terminal device 200 includes a plurality of computer-readable media. The media may be any available media that can be accessed by the terminal device 200, and includes volatile and non-volatile media, removable and non-removable media.

The memory 210 may further include computer-readable media in the form of volatile memory, such as random access memory (RAM) 240 and/or cache memory 250. The terminal device 200 may further include other removable/non-removable, volatile/non-volatile computer system storage media. For example, the storage system 260 may be configured to read and write the non-removable and non-volatile magnetic media (not shown in FIG. 18, typically referred to as a "hard drive"). Although not shown in FIG. 18, a magnetic disk drive configured to read and write a removable and non-volatile magnetic disk (for example, a "floppy disk"), and an optical disk drive configured to read and write a removable and non-volatile optical disk (for example, a CD-ROM, DVD-ROM or other optical media) may be provided. In such cases, each drive can be connected to the bus 230 by one or more data media interfaces. The memory 210 may include at least one program product having a set (for example, at least one) of program modules, wherein the program modules are configured to perform the functions of the embodiments of the present disclosure.

A program/utility 280, including a set (for example, at least one) of program modules 270, may be stored in the memory 210. The program modules 270 includes, but is not limited to, an operating system, one or more application programs, other program modules, and program data, each of which or combination thereof may include an implementation of a network environment. The program modules 270 generally performs the functions and/or method of the embodiments described herein.

The terminal device 200 may further be communicated with one or more external devices 290 (for example, a keyboard, a pointing device, a display 291, and the like), one or more devices that enable a user to interact with the terminal device 200, and/or any devices (for example, network card, modem, and the like) that enable the terminal device 200 to communicate with one or more other computer devices. The communication may perform via an input/output (110) interface 292. In addition, the terminal device 200 may be communicated with one or more networks (for example, a local area network (LAN), a wide area network (WAN), and/or a public network such as the Internet) via a network adapter 293. As shown in FIG. 18, the network adapter 293 is communicated with other modules of the terminal device 200 via the bus 230. It should be understood that although not shown in the accompanying drawing, other hardware and/or software modules, including, but not limited to, a microcode, a device driver, a redundant processing unit, an external disk drive array, a RAID system, a tape drive, and a data archival storage system, and the like, may be used in connection with the terminal device 200.

In some embodiments, the input information of the user is acquired through the input interface 292, and the acquired first answer is provided to the user via the output interface 292 upon completion of querying question by the processor 220. For example, the input information of the user may be acquired through a user interaction interface of the terminal device 200, and the first answer is provided to the user through the user interaction interface.

It should be noted that the implementation and technical principles of the terminal device in the embodiments are referred to the explanation and description of the method for querying questions in the above embodiments, which is not repeated herein.

In the terminal device in the embodiments of the present disclosure, the second answer is generated based on the input information and the intention information of the user in accordance with the answer generation rule, the final answer is generated based on the second answer and the credibility of the second answer, and the final answer is provided tor the user, thereby achieving automatically providing corresponding accurate answer to the user based on the input information of the user, saving the time and effort of the user, and improving the user experience.

In order to perform the embodiments described above, the present disclosure further provides a computer-readable storage medium.

The computer-readable storage medium stores a computer program. A processor, when executing the program, is caused to perform the method for querying questions described in the above embodiments.

In some optional implementation, the embodiment may employ any combination of one or more computer-readable media. The computer-readable medium may be a computer-readable signal medium or a computer-readable storage medium. For example, the computer-readable storage medium may be, but not limited to, an electronic, magnetic, optical, electromagnetic, infrared, or semiconductor system, apparatus, or device, or any combination thereof. More specific examples (a non-exhaustive list) of the computer-readable storage medium may include: an electrical connected and portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device having one or more wires, or any suitable combination thereof. In the context of this document, the computer-readable storage medium may be any tangible medium including or storing the program, and the program may be executed by an instruction execution system, apparatus, device, or combination thereof.

The computer-readable signal medium may include data signal propagated in baseband or as part of a carrier wave, and the data signal includes computer-readable program code. The propagated data signal may be in various forms, which includes, but is not limited to, electro-magnetic signal, optical signal, or any suitable combination thereof. The computer-readable signal medium may be any computer-readable medium but the computer-readable storage medium. The computer-readable medium may transmit, propagate, or transport the program executed by an instruction execution system, apparatus, device, or combination thereof.

The program code on the computer-readable medium may be transmitted via any appropriate medium, and the medium includes, but is not limited to, wireless, wireline, optical fiber cable, RF, and the like, or any suitable combination thereof.

Computer program codes for performing operations of the present disclosure may be written in one or more program languages or any combination thereof. The program language includes an object-oriented programming language (such as Java. Smalltalk, C++, and the like), and conventional procedural programming languages (such as the "C" programming language or similar programming languages).

The program code may be executed entirely on the computer of the user, be executed partly on the computer of the user, be executed as a stand-alone software package, be executed partly on the computer of the user and partly on a remote computer, or be executed entirely on the remote computer or server. In the case of the remote computer, the remote computer may be connected to the computer of the user through any type of network, such as a local area network (LAN) or a wide area network (WAN), or may be connected to an external computer (for example, be connected to over the Internet provided by an Internet Service).

In order to perform the embodiments described above, the present disclosure further provides a computer program product. A processor, when executing an instruction in the computer program product, is caused to perform the method for querying questions described in the above embodiments.

It should be understood for those of ordinary skill in the art that all or part of the processes of performing the embodiments described above are implemented by related hardware instructed by the program. The program may be stored in a computer-readable storage medium, and the process, when being executed, includes one of the processes of the embodiments of method or combination thereof.

Furthermore, the various function units in the embodiments of the present disclosure may be integrated in one processing module, or may be separately and physically in each unit, or may be integrated in one module with two or more units. The above integrated modules may be implemented with hardware, or in the form of software functional modules. The integrated modules may also be stored in a computer-readable storage medium when being implemented in the form of software functional module and sold or used as separate product.

The storage medium mentioned above may be a read-only memory, a magnetic, an optical disk, or the like.

Described above are is only preferred embodiments of the present disclosure. It is noted that any modifications and adaptations may be made by those of ordinary skill in the art without departing from the principles of the present disclosure, which are considered as the scope of the disclosure.

What is claimed is:

1. A method for querying questions, comprising:
acquiring input information of a user;
acquiring intention information of the user based on the input information of the user;
determining an answer generation rule; and
generating, based on the input information and the intention information, a first answer in accordance with the answer generation rule, and providing the first answer to the user;
wherein upon acquiring the input information of the user, the method further comprises:
determining whether a number of characters in the input information is greater than a second threshold;
generating a plurality of single sentences by segmenting the input information in the case that the number of characters in the input information is greater than the second threshold;
determining a third similarity between each two single sentences in the plurality of single sentences in accordance with a preset algorithm; and
determining a key sentence based on the third similarity between each two single sentences, and determining the key sentence as final input information.

2. The method for querying questions according to claim 1, wherein in the case that the answer generation rule is a first rule, and generating, based on the input information and the intension information, the first answer in accordance with the answer generation rule comprises:
generating, based on the input information and the intention information, a second answer in accordance with a question and answer model, and acquiring a credibility of the second answer; and
generating the first answer based on the credibility of the second answer and the second answer.

3. The method for querying questions according to claim 2, wherein generating the first answer based on the credibility of the second answer and the second answer comprises:
taking the second answer as the first answer in the case that the credibility of the second answer is greater than a first threshold;
further determining whether a third answer is generatable based on the input information in accordance with a knowledge graph model in the case that the credibility of the second answer is less than or equal to the first threshold;
taking the third answer as the first answer in the case that the credibility of the second answer is less than or equal to the first threshold and the third answer is generatable in accordance with the knowledge graph model; and
taking the second answer as the first answer in the case that the credibility of the second answer is less than or equal to the first threshold and the third answer is not generatable in accordance with the knowledge graph model.

4. The method for querying questions according to claim 3, wherein generating the third answer in accordance with the knowledge graph model comprises:
identifying an entity type and a relationship type in the input information; and
generating the third answer based on the entity type and relationship type by querying the knowledge graph model.

5. The method for querying questions according to claim 2, wherein generating, based on the input information and the intension information, the second answer in accordance with the question and answer model, and acquiring the credibility of the second answer comprise:
acquiring a feature vector representation of the input information;
acquiring a set of candidate questions corresponding to the intention information from a preset library of questions and answers;
acquiring a feature vector representation of each candidate question in the set of candidate questions;
calculating a first similarity between the feature vector representation of the input information and the feature vector representation of each candidate question;
selecting a first candidate question from the set of candidate questions based on the first similarity between the feature vector representation of the input information and the feature vector representation of each candidate question; and
taking a candidate answer corresponding to the first candidate question in the library of questions and answers as the second answer, wherein the first similarity between the feature vector representation of the input information and the feature vector representation of the selected first candidate question is the credibility of the second answer.

6. The method for querying questions according to claim 1, wherein in the case that the answer generation rule is a second rule, and generating, based on the input information and the intension information, the first answer in accordance with the answer generation rule comprises:
- determining whether the intention information comprises food; determining whether a second answer is generatable based on the input information in accordance with a question and answer model in the case that the intention information does not comprises food;
- taking the second answer as the first answer in the case that the second answer is generatable in accordance with the question and answer model;
- determining whether a third answer is generatable based on the input information in accordance with a knowledge graph model in the case that the intention information comprises food; and
- taking the third answer as the first answer in the case that the third answer is generatable in accordance with the knowledge graph model.

7. The method for querying questions according to claim 6, wherein generating, based on the input information and the intention information, the first answer in accordance with the answer generation rule further comprises:
- generating, based on the input information, the third answer in accordance with the knowledge graph model in the case that the second answer is not generatable in accordance with the question and answer model, and taking the third answer as the first answer; and
- generating, based on the input information, the second answer in accordance with the question and answer model in the case that the third answer is not generated in accordance with the knowledge graph model.

8. The method for querying questions according to claim 6, wherein prior to determining whether the intention information comprises food, the method further comprises:
- determining whether the second answer is generatable based on the input information in accordance with the question and answer model or the third answer is generatable based on the input information in accordance with the knowledge graph model; and
- acquiring a set of candidate questions corresponding to the intention information from a preset library of questions and answers in the case that the second answer is not generatable in accordance with the question and answer model, and the third answer is not generatable in accordance with the knowledge graph model, and providing candidate questions in the set of candidate questions to the user.

9. The method for querying questions according to any one of claim 6, wherein generating, based on the input information and the intention information, the second answer in accordance with the question and answer model comprises:
- acquiring a feature vector representation of the input information;
- acquiring a set of candidate questions corresponding to the intention information from a preset library of questions and answers;
- acquiring a feature vector representation of each candidate question in the set of candidate questions;
- calculating a first similarity between the feature vector representation of the input information and the feature vector representation of each candidate question;
- determining one or more candidate questions from the set of candidate questions based on the first similarity between the feature vector representation of the input information and the feature vector representation of each candidate question;
- taking a candidate answer corresponding to the candidate question in the library of questions and answers as the second answer in the case that the candidate question is determined;
- providing a plurality of candidate questions to the user in the case that the plurality of candidate questions are determined;
- acquiring a first select instruction of the user;
- determining a candidate question selected by the user based on the first select instruction; and
- taking a candidate answer corresponding to the candidate question selected by the user from the library of questions and answers as the second answer.

10. The method for querying questions according to any one of claim 1, wherein acquiring the intention information of the user based on the input information of the user comprises:
- acquiring a feature vector representation of the input information; and
- acquiring the intention information of the user by inputting the feature vector representation of the input information into an intention prediction model.

11. The method for querying questions according to claim 1, wherein prior to acquiring the input information of the user, the method further comprises:
- acquiring attribute information of the user;
- determining a feature vector representation of the attribute information;
- determining a second similarity between the feature vector representation of the attribute information and a feature vector representation of each standard question in a preset library of questions and answers; and
- providing a recommendation question to the user based on the second similarity.

12. The method for querying questions according to claim 11, wherein upon providing the recommendation question to the user, the method further comprises:
- acquiring a second select instruction of the user;
- determining a recommendation question selected by the user based on the second select instruction;
- acquiring a fourth answer from the preset library of questions and answers based on the recommendation question selected by the user; and
- providing the fourth answer to the user.

13. The method for querying questions according to claim 1, wherein upon acquiring the input information of the user, the method further comprises:
- generating a plurality of words by segmenting the input information;
- determining whether the plurality of words are matched with any word in a preset library of synonyms; and
- selecting a prompt question from a preset library of questions and answers based on the match result, and providing the prompt question to the user.

14. The method for querying questions according to claim 13, wherein upon selecting the prompt question from the preset library of questions and answers based on the match result, the method further comprises:
- acquiring a third select instruction of the user;
- determining the prompt question selected by the user based on the third select instruction;
- acquiring a fifth answer from the preset library of questions and answers based on the prompt question selected by the user; and
- providing the fifth answer to the user.

15. The method for querying questions according to claim 1, wherein upon determining whether the number of characters in the input information is greater than the second threshold, the method further comprises:

determining whether the input information satisfies a preset supplementation condition in the case that the number of characters in the input information is not greater than the second threshold;

acquiring history input information of the user in the case that the number of characters in the input information is greater than the second threshold; and supplementing the input information based on the history input information, and taking the supplemented information as the final input information.

16. A terminal device, comprising a memory, a processor, and a computer program stored on the memory and executable on the processor, wherein the processor, when loading and running the computer program, is caused to perform a method for querying questions, comprising:

acquiring input information of a user;

acquiring intention information of the user based on the input information of the user;

determining an answer generation rule; and generating, based on the input information and the intention information, a first answer in accordance with the answer generation rule, and providing the first answer to the user; and the processor, when loading and running the computer program, is further caused to perform:

determining whether a number of characters in the input information is greater than a second threshold;

generating a plurality of single sentences by segmenting the input information in the case that the number of characters in the input information is greater than the second threshold;

determining a third similarity between each two single sentences in the plurality of single sentences in accordance with a preset algorithm; and determining a key sentence based on the third similarity between each two single sentences, and determining the key sentence as final input information.

17. A non-transitory computer-readable storage medium storing a computer program, wherein the computer program, when loaded and run by a processor, causes the processor to perform a method for querying questions, comprising:

acquiring input information of a user;

acquiring intention information of the user based on the input information of the user;

determining an answer generation rule; and generating, based on the input information and the intention information, a first answer in accordance with the answer generation rule, and providing the first answer to the user; and the computer program, when loaded and run by a processor, causes the processor to perform:

determining whether a number of characters in the input information is greater than a second threshold;

generating a plurality of single sentences by segmenting the input information in the case that the number of characters in the input information is greater than the second threshold;

determining a third similarity between each two single sentences in the plurality of single sentences in accordance with a preset algorithm; and determining a key sentence based on the third similarity between each two single sentences, and determining the key sentence as final input information.

* * * * *